United States Patent
Yea et al.

(10) Patent No.: US 10,427,966 B2
(45) Date of Patent: Oct. 1, 2019

(54) GLASS FORMING APPARATUS AND METHOD

(71) Applicant: Samsung Electronics Co., Ltd, Gyeonggi-do (KR)

(72) Inventors: Jeong Soo Yea, Gwangju (KR); Sang Jun Jung, Gyeonggi-do (KR); Kyong Rok Kang, Gyeonggi-do (KR); Dong Oh Min, Gyeonggi-do (KR); In Youl Seo, Gyeonggi-do (KR); Sung Jin Jang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 36 days.

(21) Appl. No.: 15/514,477

(22) PCT Filed: Sep. 2, 2015

(86) PCT No.: PCT/KR2015/009212
§ 371 (c)(1),
(2) Date: Mar. 24, 2017

(87) PCT Pub. No.: WO2016/068473
PCT Pub. Date: May 6, 2016

(65) Prior Publication Data
US 2017/0297944 A1    Oct. 19, 2017

(30) Foreign Application Priority Data

Oct. 30, 2014 (KR) .......................... 10-2014-0148991
Jul. 21, 2015 (KR) .......................... 10-2015-0102880

(51) Int. Cl.
*C03B 23/035* (2006.01)
*C03B 23/03* (2006.01)
(Continued)

(52) U.S. Cl.
CPC ........ *C03B 23/035* (2013.01); *C03B 23/0235* (2013.01); *C03B 23/0302* (2013.01);
(Continued)

(58) Field of Classification Search
CPC ............ C03B 23/0302; C03B 23/0305; C03B 23/0357; C03B 11/12; C03B 11/122; C03B 11/125; C03B 11/16
See application file for complete search history.

(56) References Cited

U.S. PATENT DOCUMENTS 3,936,257 A * 2/1976 Christiansen ........... B29C 43/18
                                                        425/125
5,992,178 A    11/1999 Kuster
(Continued)

FOREIGN PATENT DOCUMENTS

CN    101309873 A    11/2008
CN    202099183 U    1/2012
(Continued)

OTHER PUBLICATIONS

KR1020060053639 KIPON Machine Translation Performed Aug. 13, 2018. (Year: 2018).*
(Continued)

*Primary Examiner* — Lisa L Herring

(57) ABSTRACT

Disclosed here are a glass forming apparatus and a method of forming a glass. A glass forming apparatus of the present invention includes a transfer unit which moves a material, a preheating unit which preheats the material supplied by the transfer unit, a curved surface forming unit which forms the material in a curved shape, and a cooling unit which cools the material in the curved shape transformed by the curved surface forming unit, wherein the curved surface forming unit includes a moving mold in which a plurality of curved surface-shaped cores configured to seat the preheated mate-
(Continued)

rial are formed and the moving mold is provided to be movable, a first mold disposed to face the moving mold, a plurality of cavities formed between the moving mold and the first mold, and a pneumatic device which generates a vacuum pressure in the plurality of cavities to adhere the material to the curved surface-shaped cores.

15 Claims, 20 Drawing Sheets

(51) Int. Cl.
*C03B 35/14* (2006.01)
*C03B 23/023* (2006.01)

(52) U.S. Cl.
CPC ........ *C03B 23/0357* (2013.01); *C03B 35/142* (2013.01); *Y02P 40/57* (2015.11)

(56) References Cited

U.S. PATENT DOCUMENTS

| | | | |
|---|---|---|---|
| 2004/0020244 A1 | 2/2004 | Kramer et al. | |
| 2006/0032273 A1* | 2/2006 | Wang | C03B 11/08 65/319 |
| 2009/0117332 A1 | 5/2009 | Ellsworth et al. | |
| 2009/0127727 A1 | 5/2009 | Matsushima et al. | |
| 2010/0127420 A1* | 5/2010 | Dannoux | C03B 11/10 264/235 |
| 2011/0067450 A1 | 3/2011 | Fredholm et al. | |
| 2011/0075264 A1* | 3/2011 | Chen | B29D 11/00009 359/619 |
| 2012/0297828 A1* | 11/2012 | Bailey | C03B 23/0235 65/29.18 |
| 2013/0192305 A1* | 8/2013 | Black | C03B 33/0222 65/30.14 |
| 2013/0298608 A1 | 11/2013 | Langsdort et al. | |
| 2014/0230493 A1 | 8/2014 | Balduin et al. | |
| 2015/0197039 A1* | 7/2015 | Matsuzuki | C03B 11/122 264/297.7 |

FOREIGN PATENT DOCUMENTS

| | | |
|---|---|---|
| CN | 103803779 A | 5/2014 |
| DE | 10147648 A1 | 4/2003 |
| DE | 102005060907 A1 | 6/2007 |
| EP | 1964819 A1 | 9/2008 |
| EP | 2307325 A1 | 4/2011 |
| GB | 1072011 A | 6/1967 |
| JP | S61236623 A | 10/1986 |
| JP | S6270239 A | 3/1987 |
| JP | 2684716 B2 | 12/1997 |
| JP | H11204035 A | 7/1999 |
| KR | 1020060053639 A | 5/2006 |
| KR | 1020110096455 A | 8/2011 |
| KR | 1020140039216 A | 4/2014 |
| KR | 1020140111403 A | 9/2014 |
| KR | 1020140118431 A | 10/2014 |
| WO | 2010002446 A1 | 1/2010 |
| WO | 2010061238 A1 | 6/2010 |
| WO | 2012118612 A1 | 9/2012 |

OTHER PUBLICATIONS

Office Action dated Dec. 30, 2016 in connection with Korean Patent Application No. 10-2015-0102880.
Office Action dated Aug. 23, 2016 in connection with Korean Patent Application No. 10-2015-0102880.
Notice of Allowance dated Mar. 21, 2017 in connection with Korean Patent Application No. 10-2015-0102880.
International Search Report dated Nov. 30, 2015 in connection with International Application No. PCT/KR2015/009212, 5 pages.
Extended European Search Report, dated Dec. 8, 2017, regarding Application No. 15854085.6, 10 pages.
China National Intellectual Property Administration, "Text of the First Office Action," Application No. CN201580057980.1, May 7, 2019, 14 pages.
European Patent Office, "Communication pursuant to Article 94(3) EPC," Application No. EP15854085.6, May 22, 2019, 5 pages.

* cited by examiner

[Fig. 1]
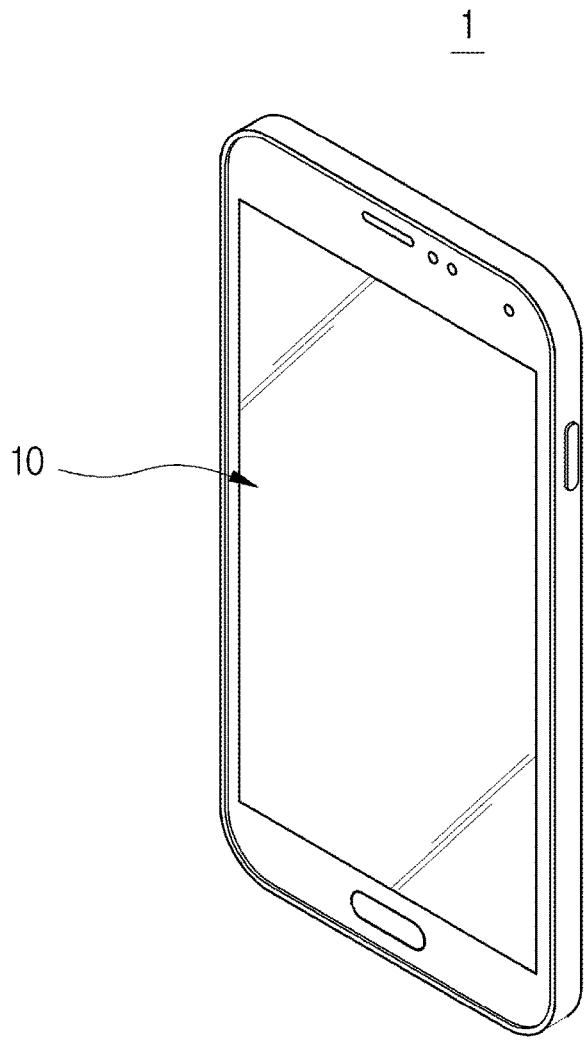
[Fig. 2]
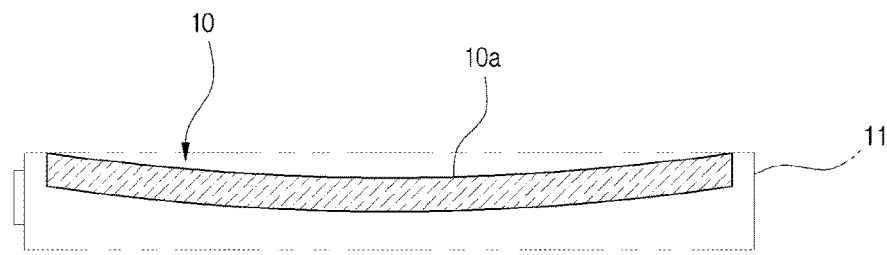

[Fig. 3]
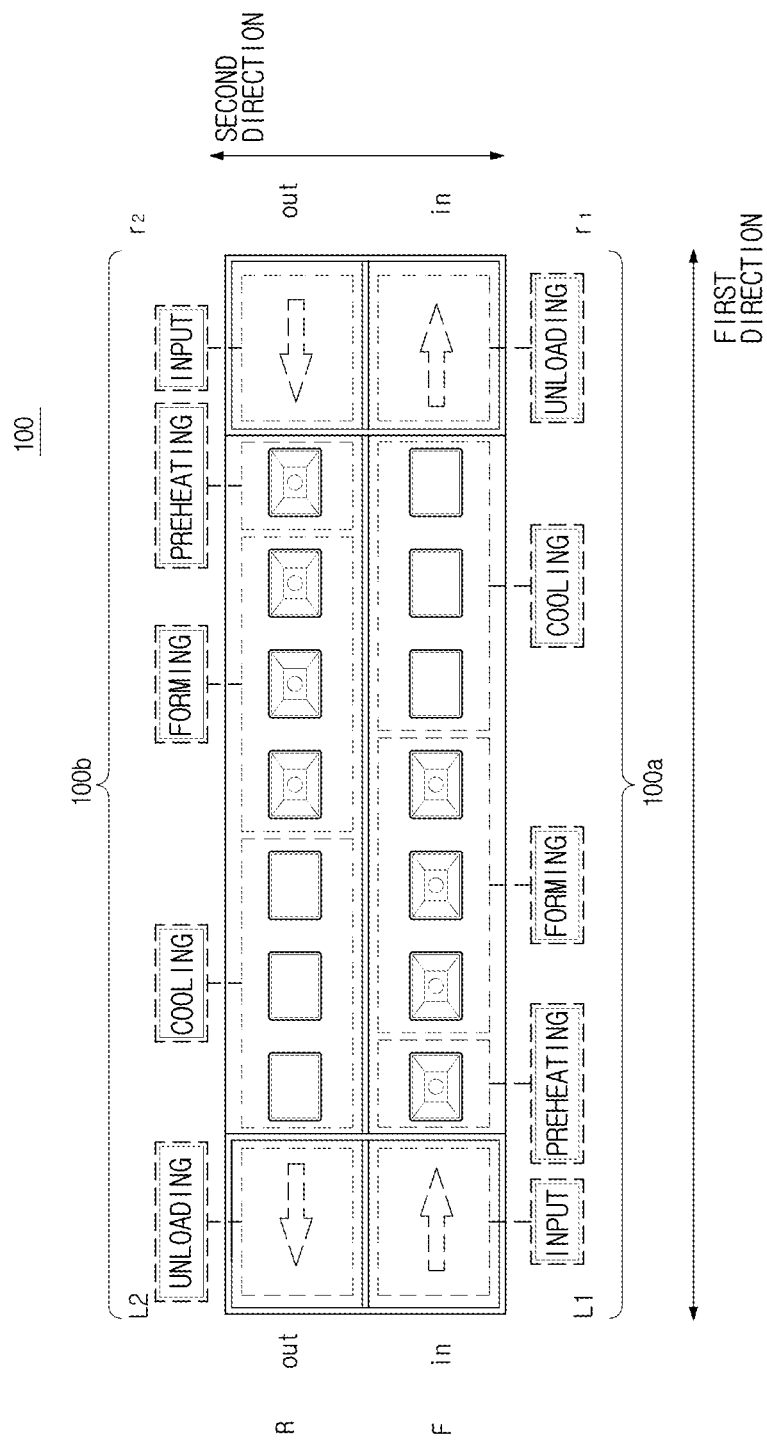

[Fig. 4]
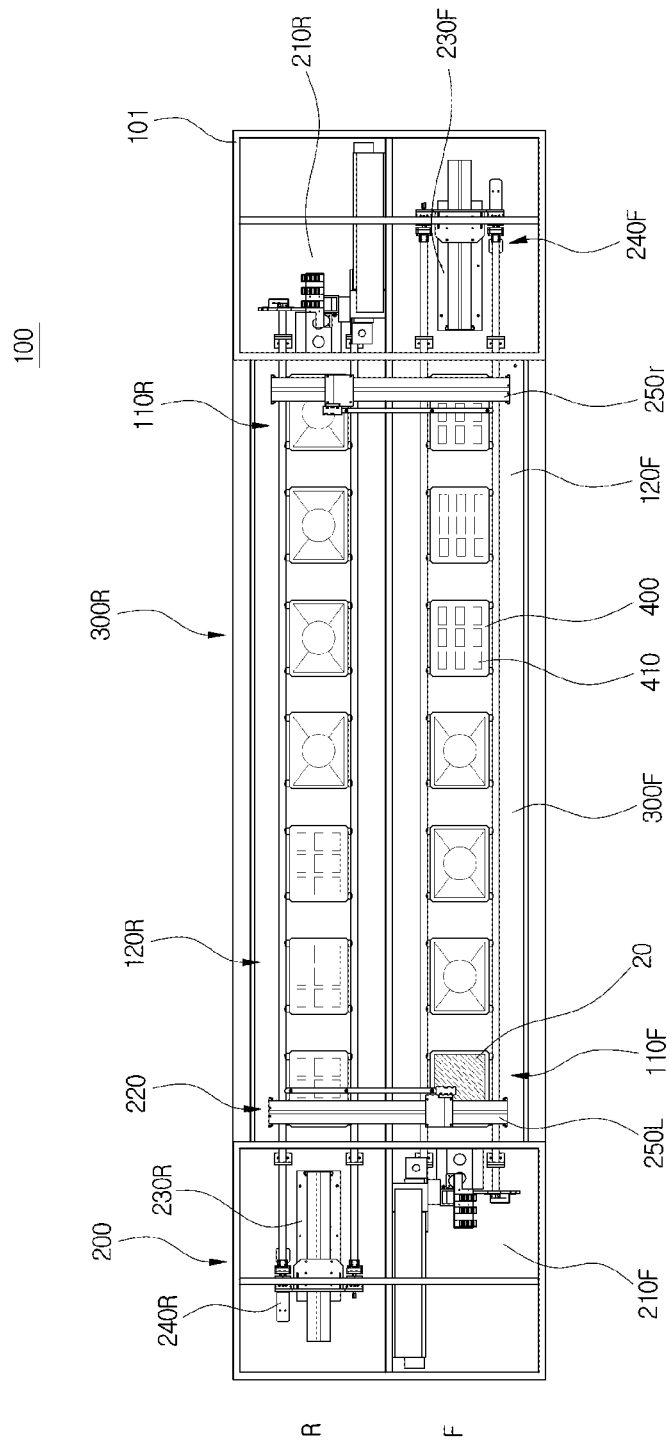

[Fig. 5]
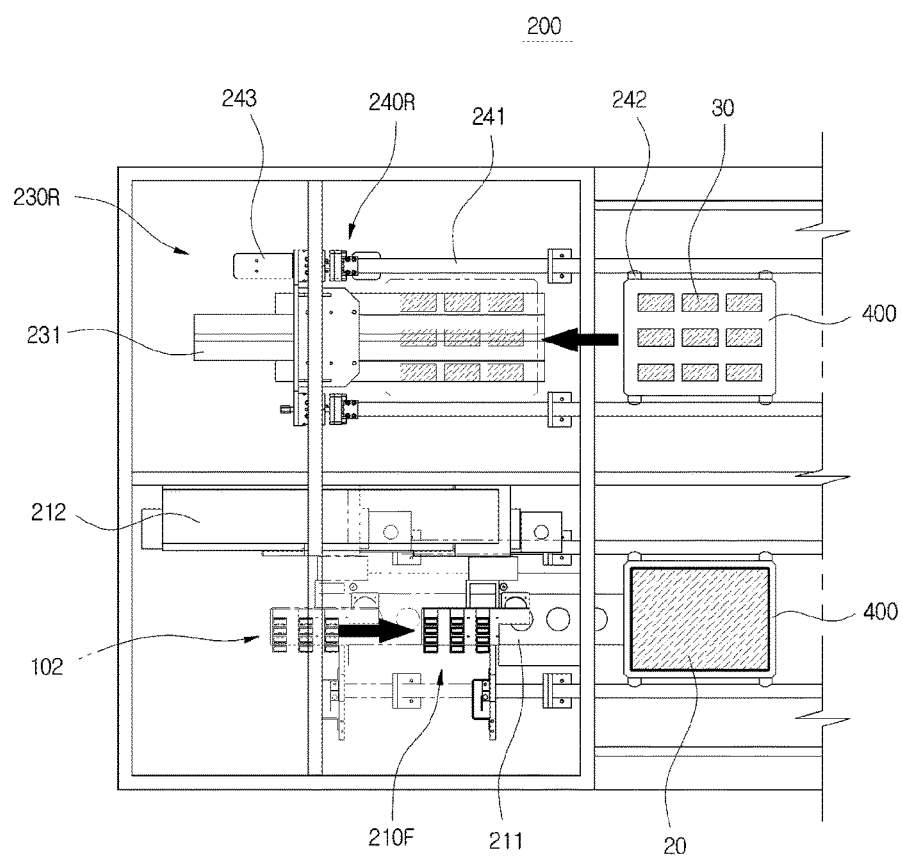

[Fig. 6]
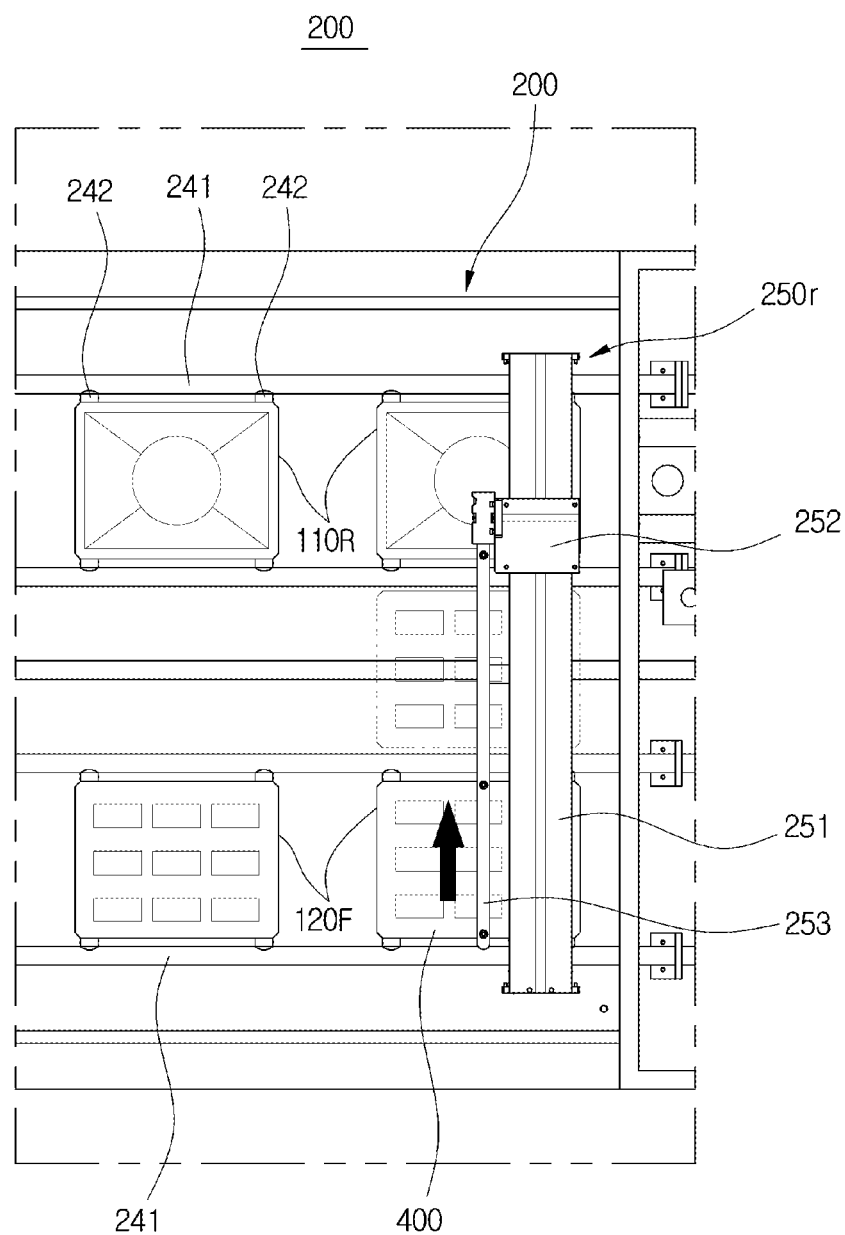

[Fig. 7]
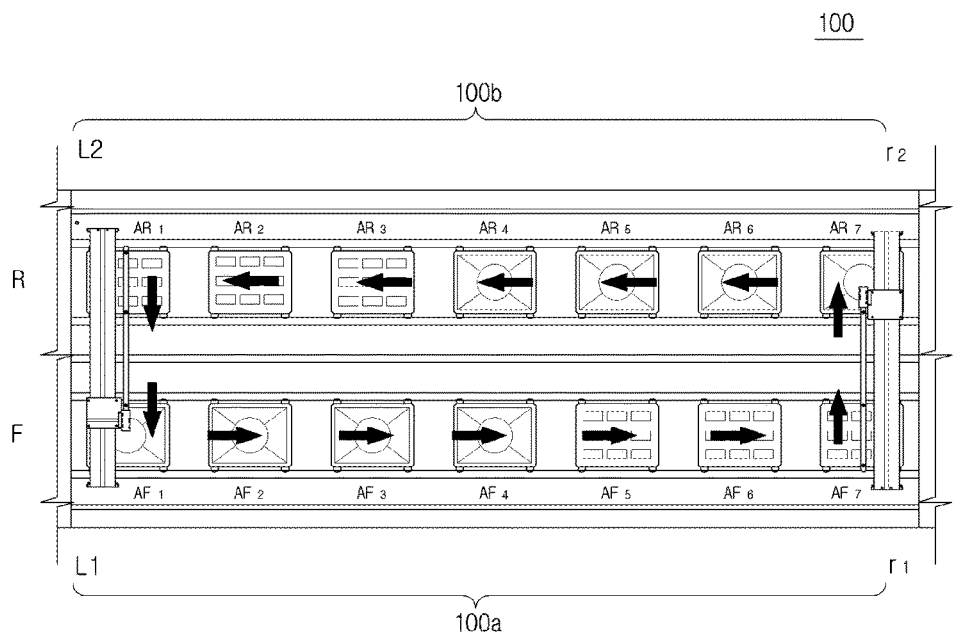
[Fig. 8]
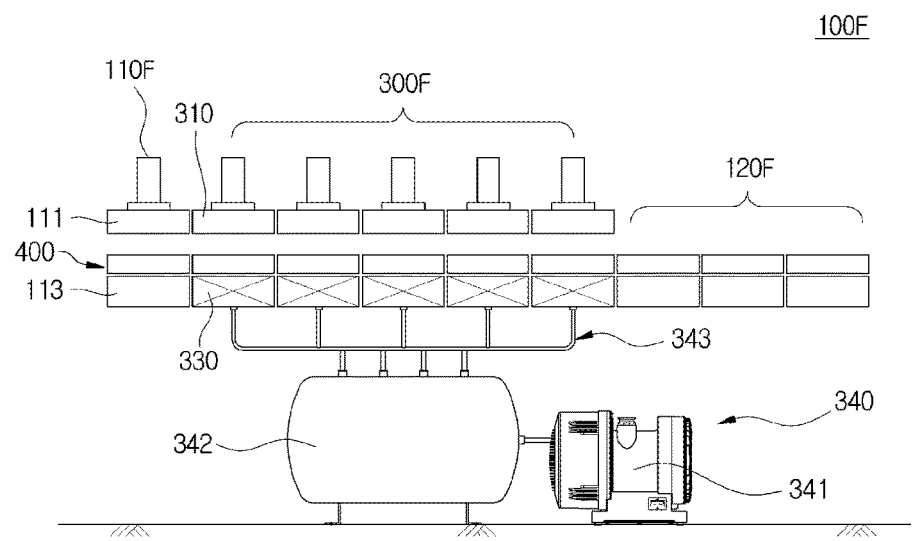

[Fig. 9]
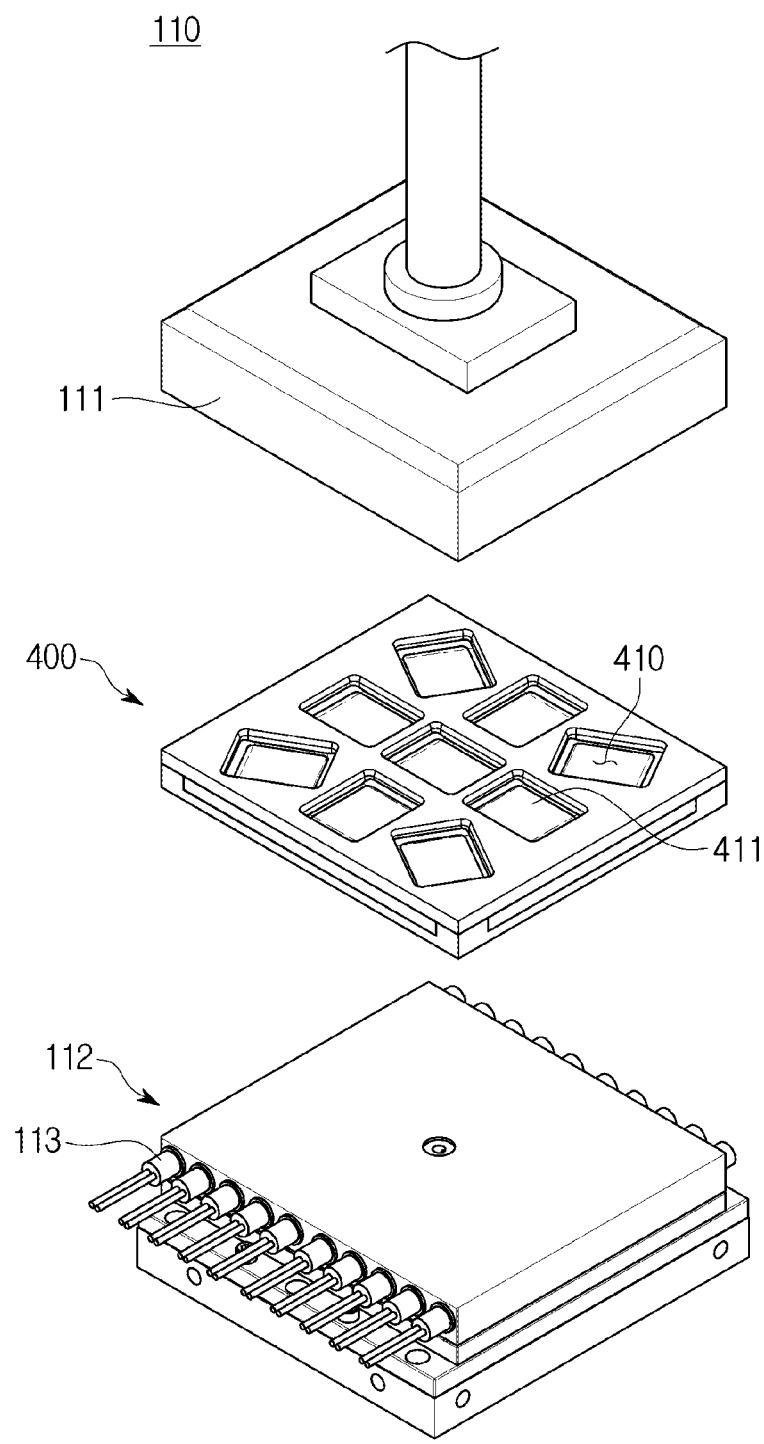

[Fig. 10]
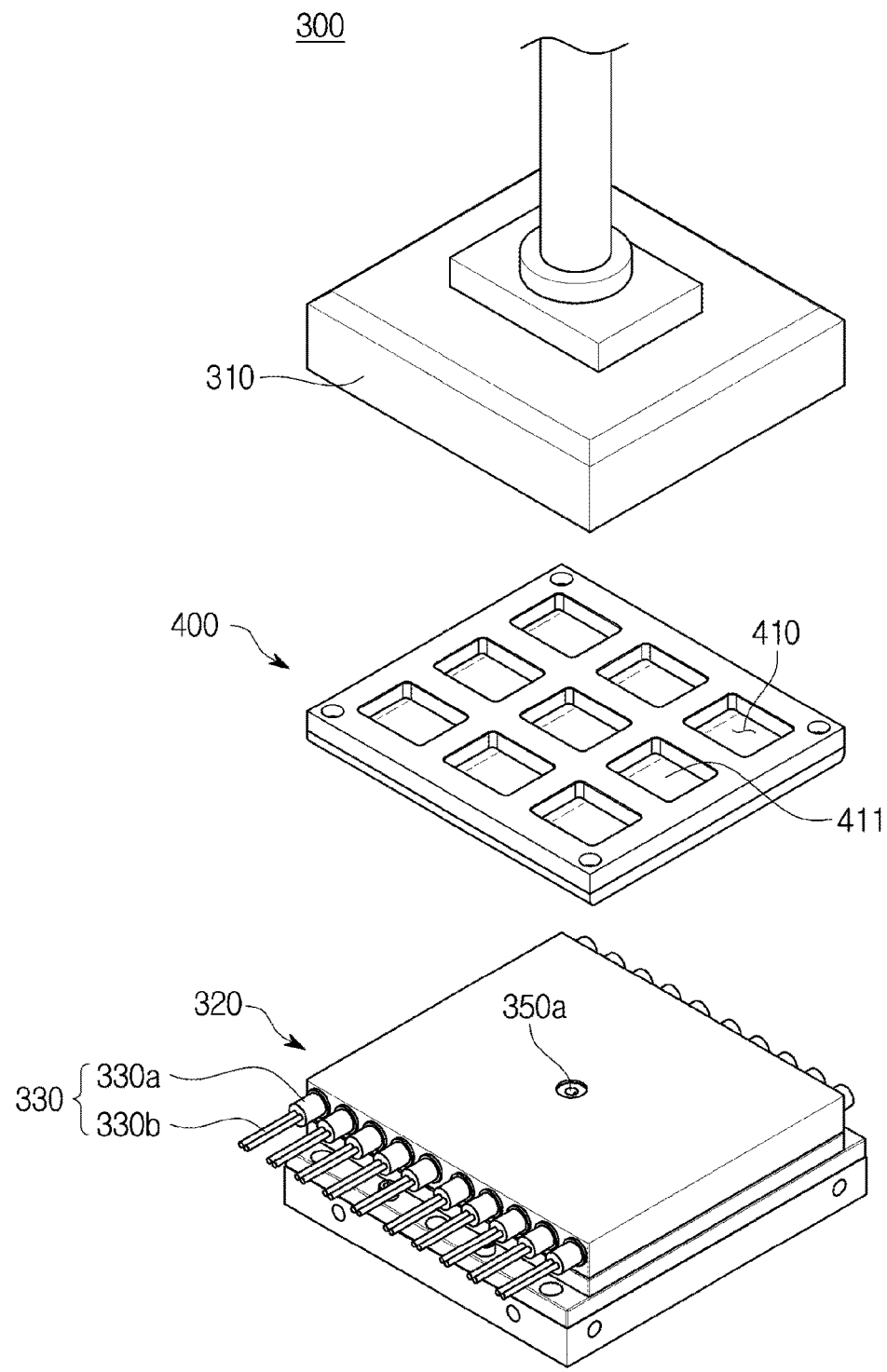

[Fig. 11]
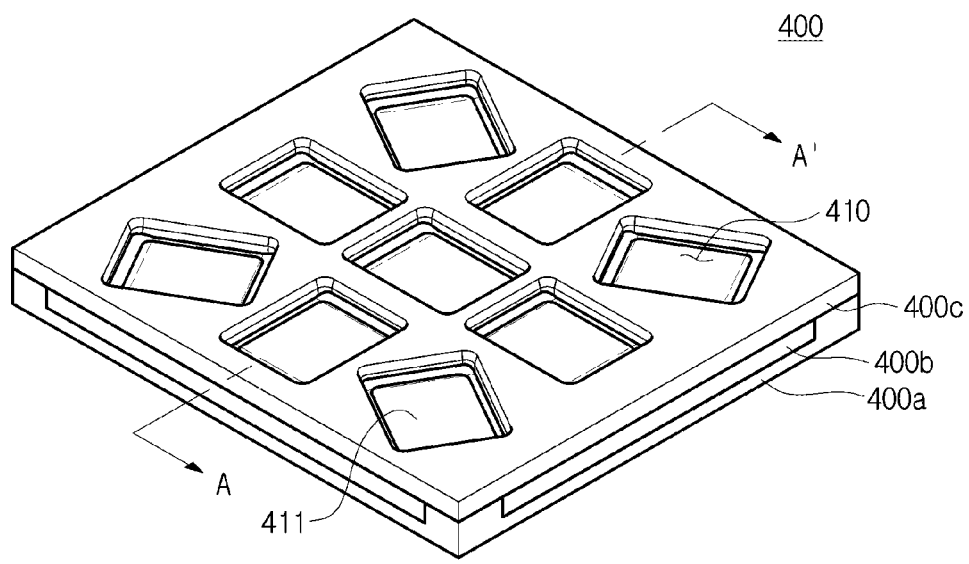

[Fig. 12]
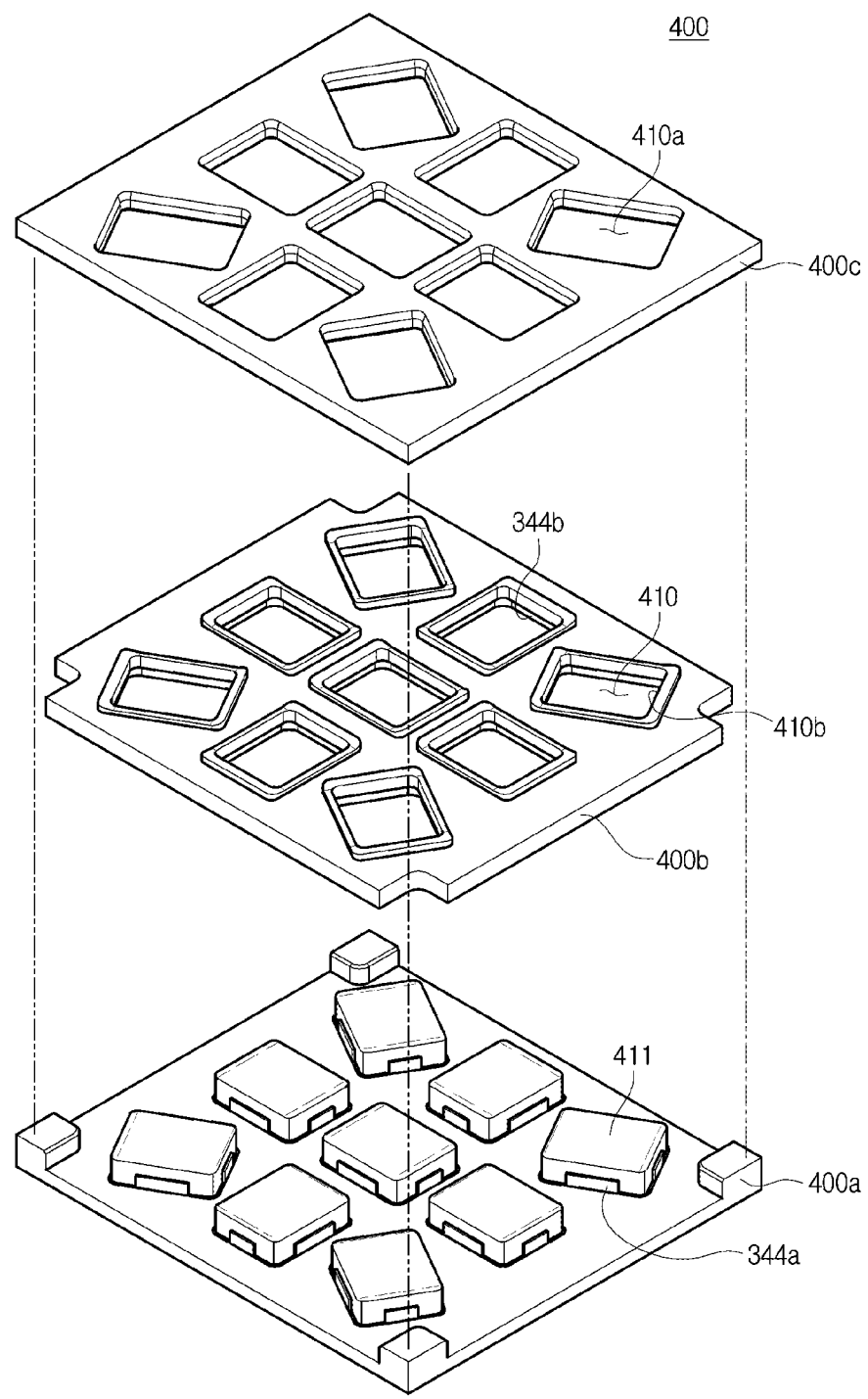

[Fig. 13]
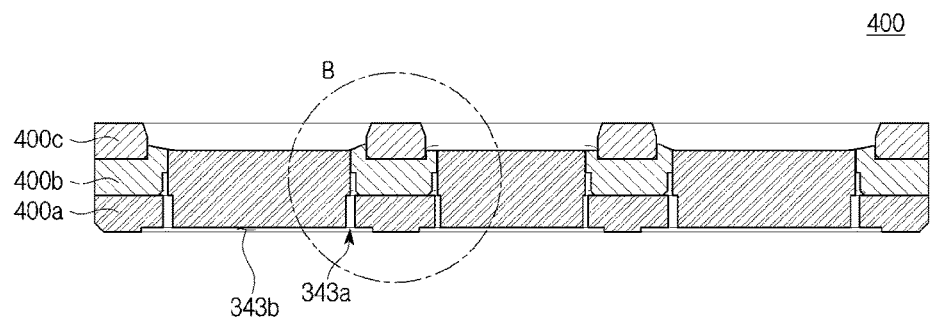
[Fig. 14]
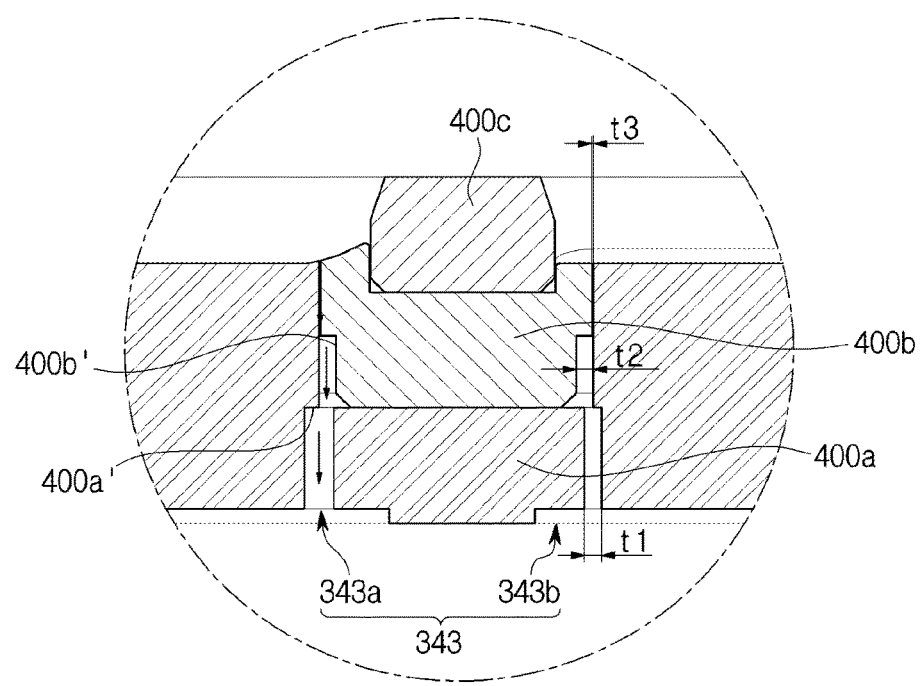

[Fig. 15]
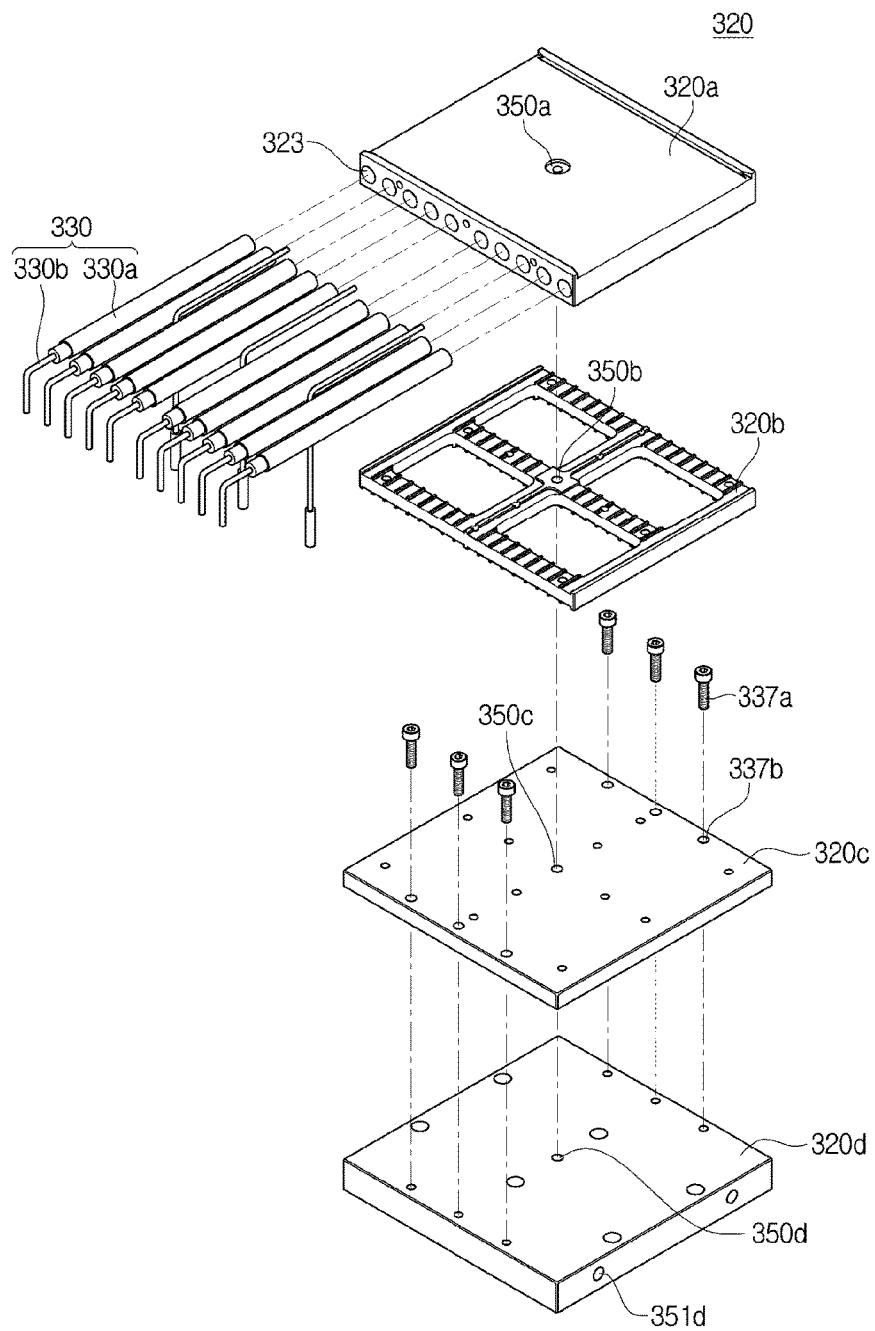

[Fig. 16]
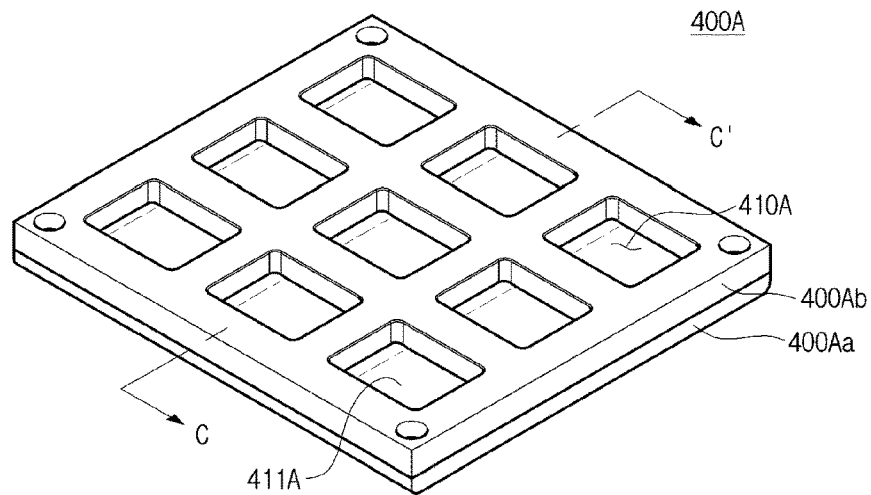
[Fig. 17]
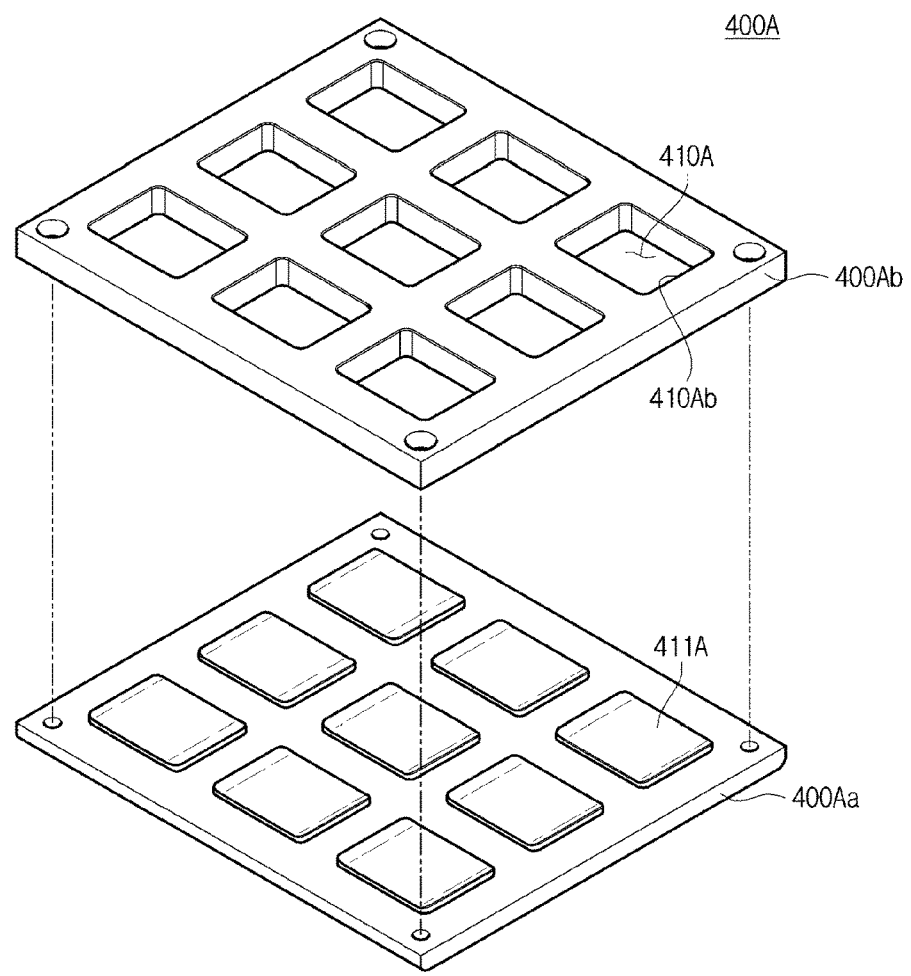

[Fig. 18]
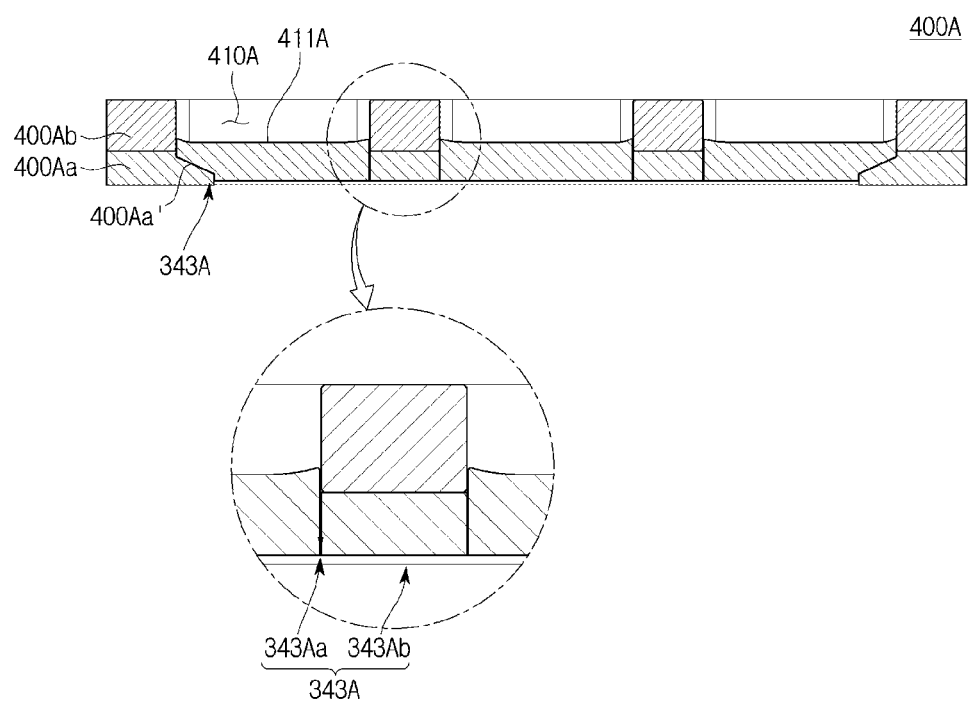

[Fig. 19]
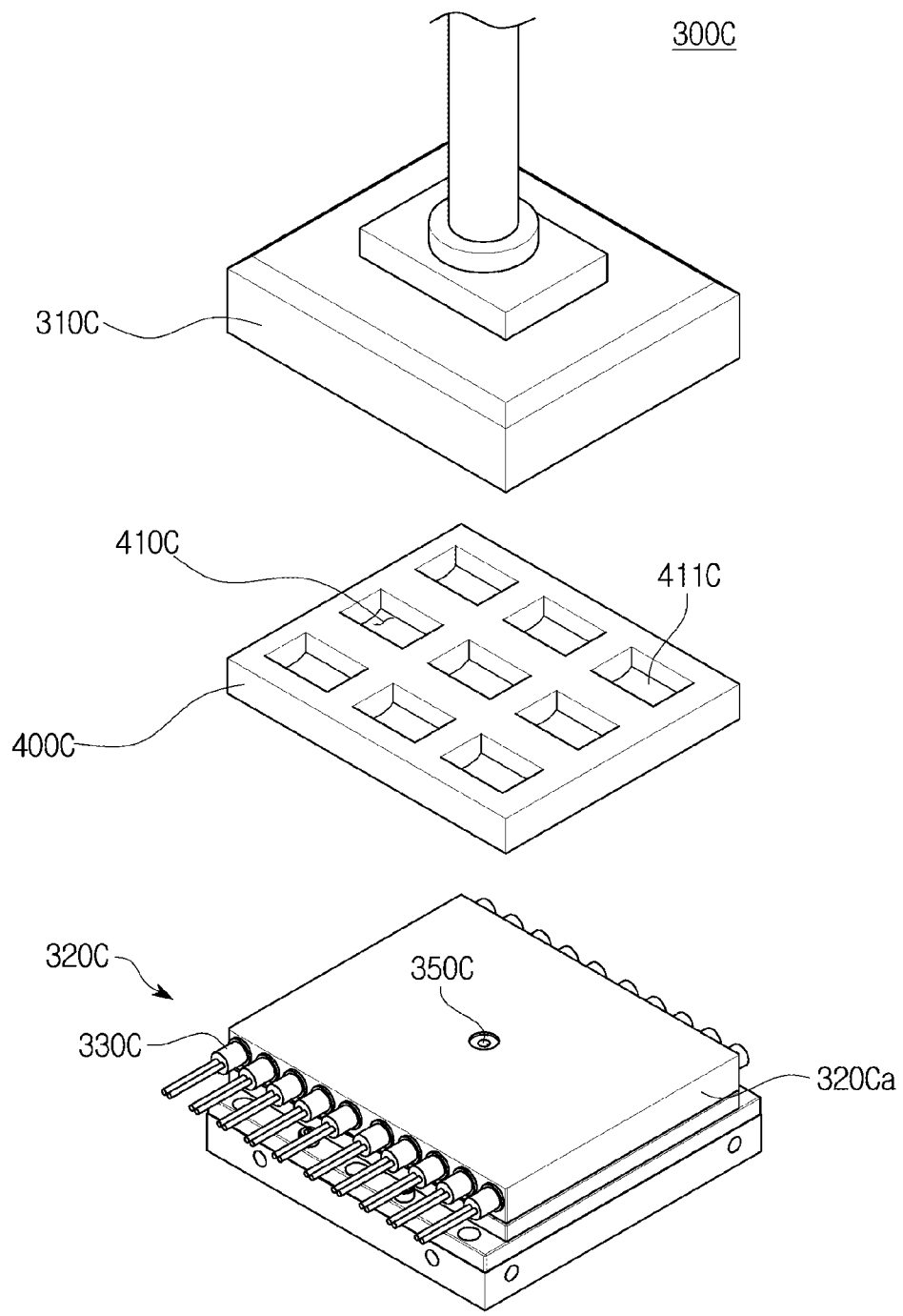

[Fig. 20]
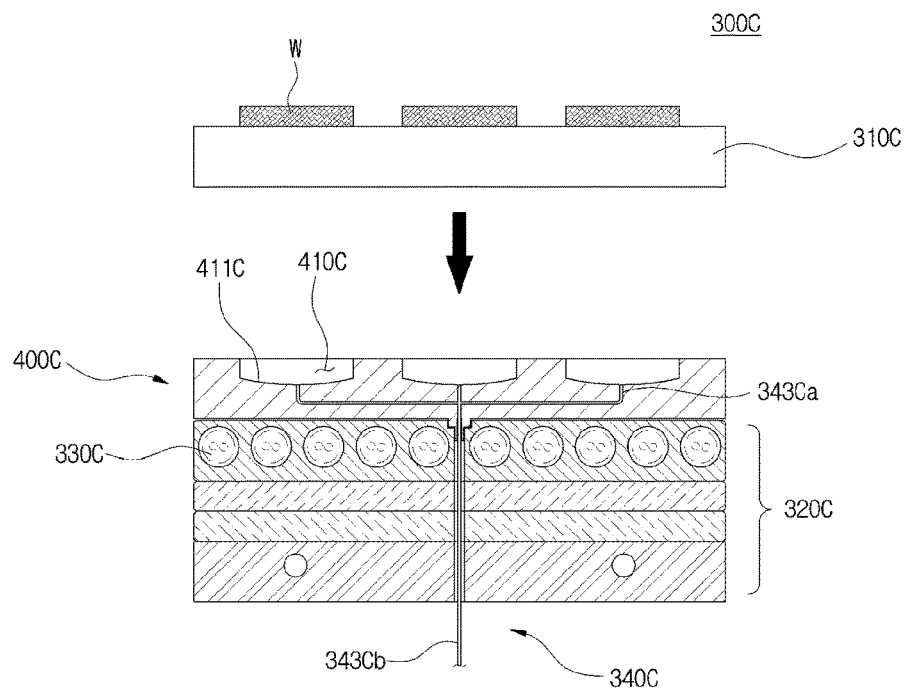
[Fig. 21]
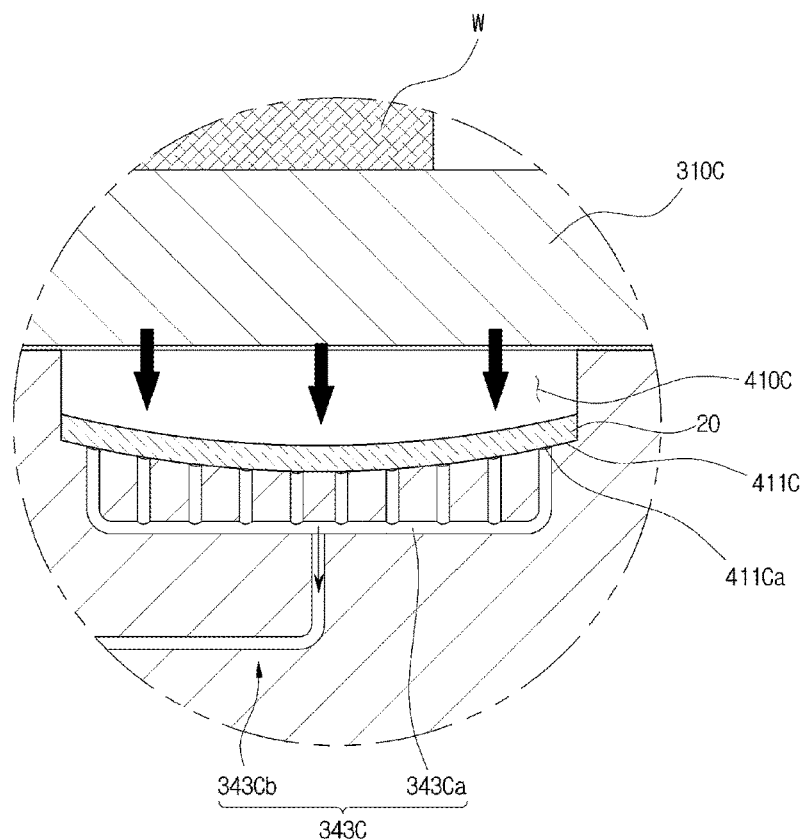

[Fig. 22]
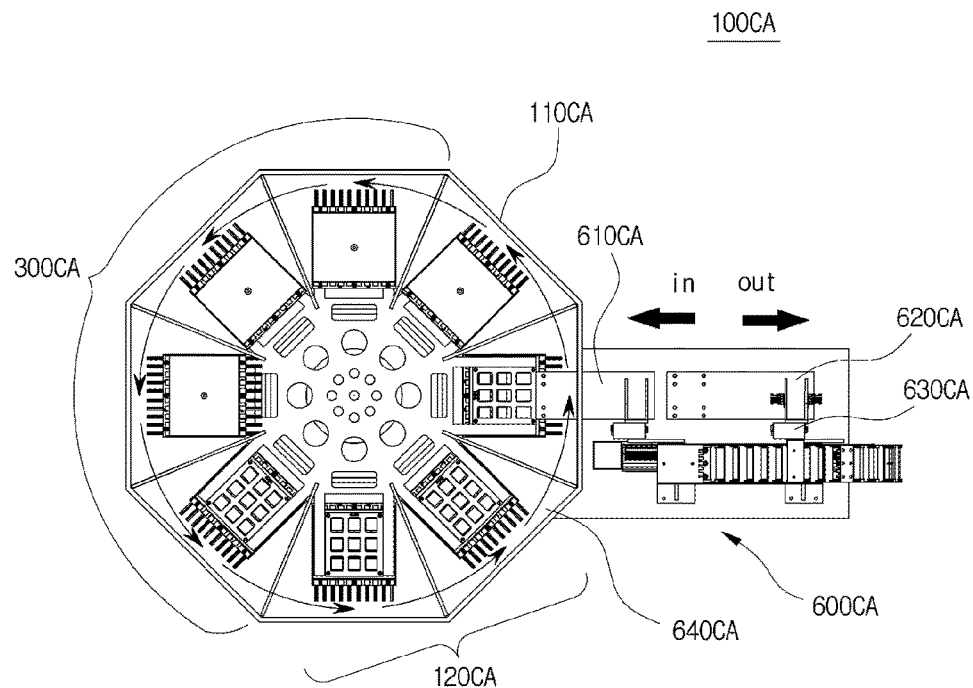
[Fig. 23]
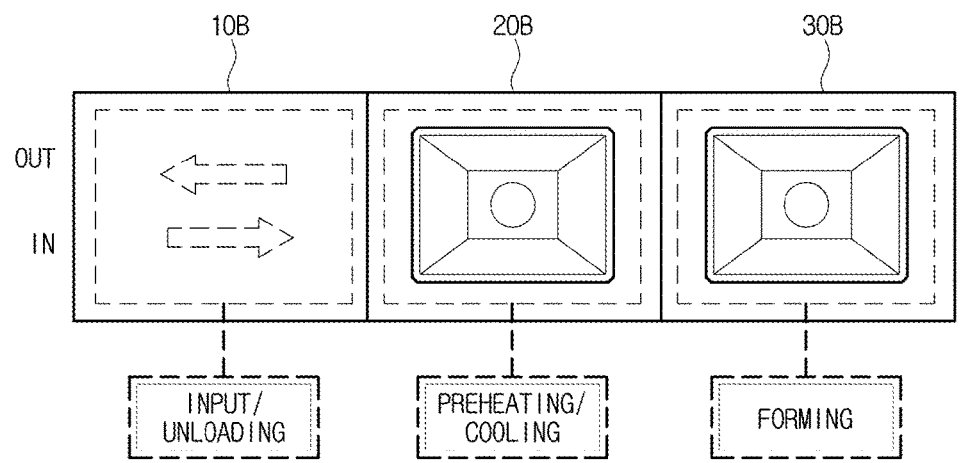

[Fig. 24]
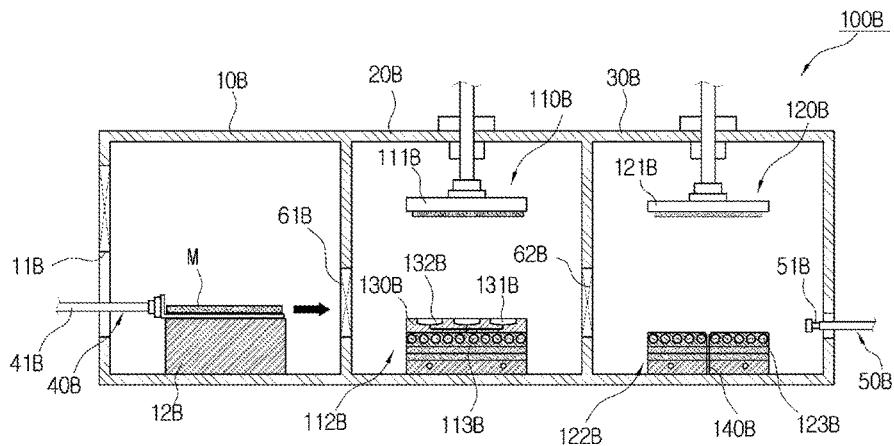
[Fig. 25]
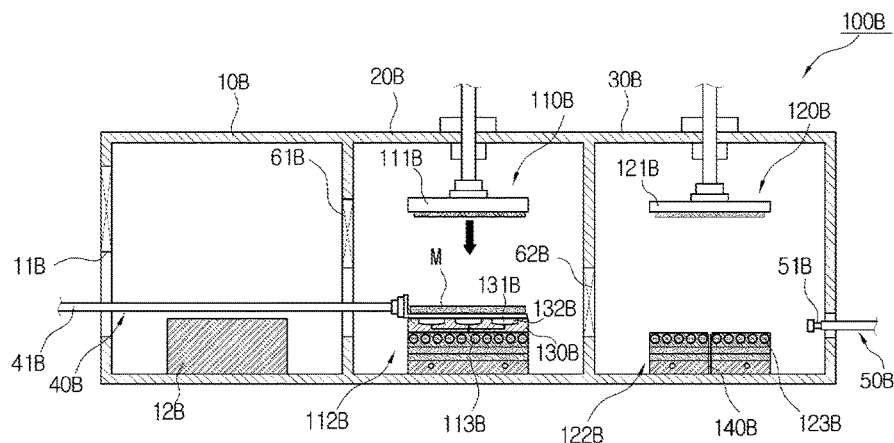
[Fig. 26]
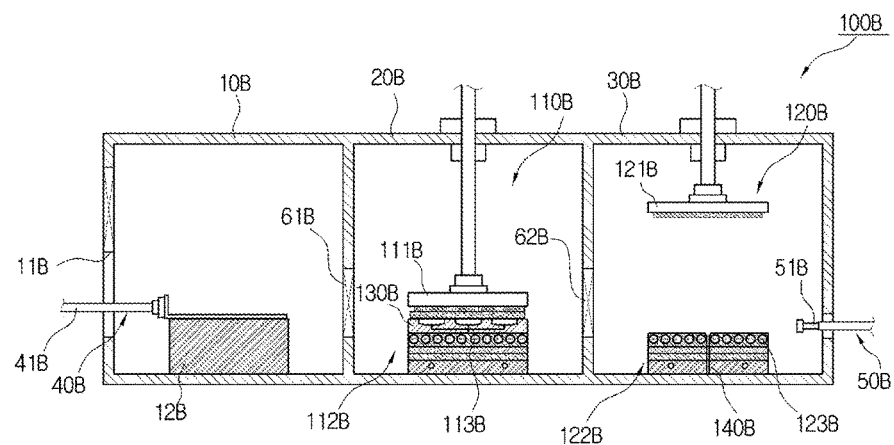

[Fig. 27]
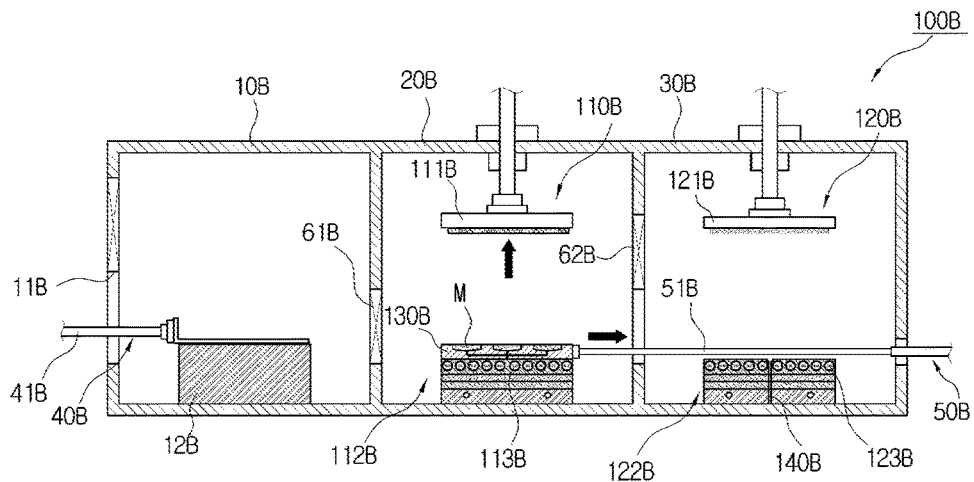
[Fig. 28]
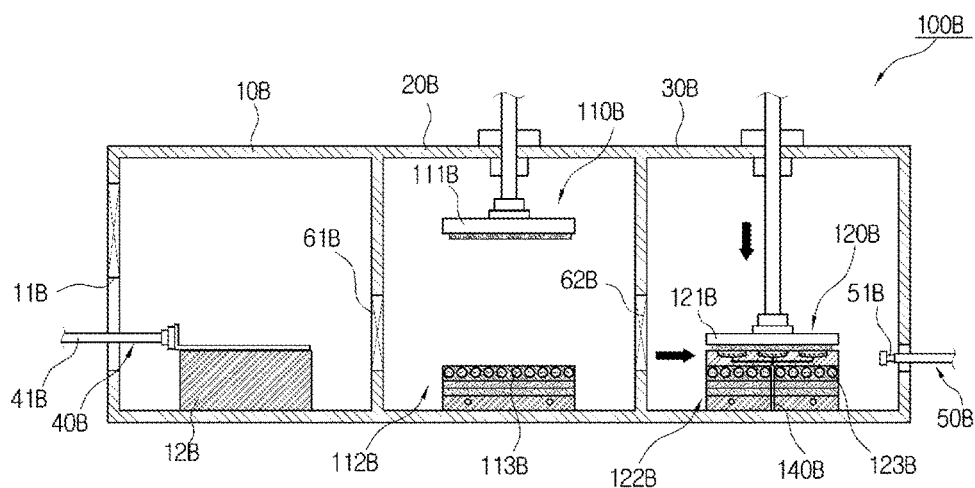
[Fig. 29]
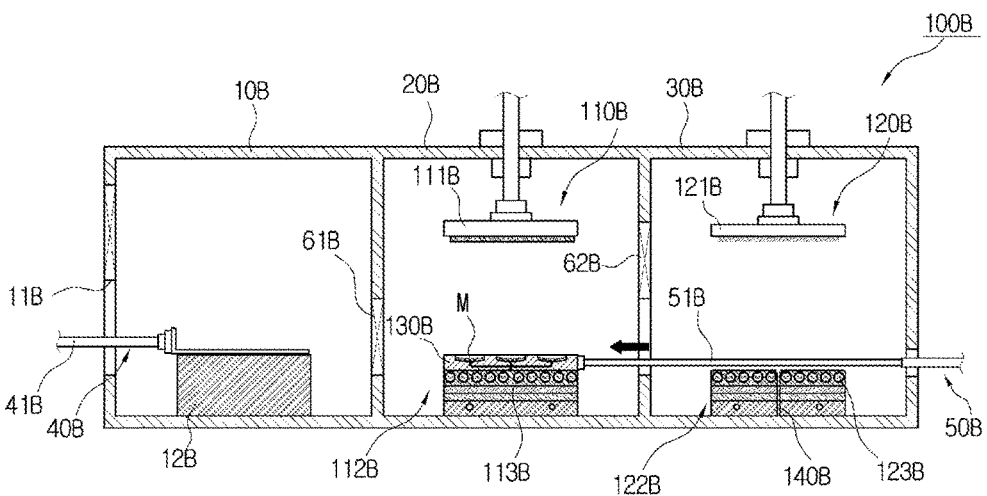

[Fig. 30]
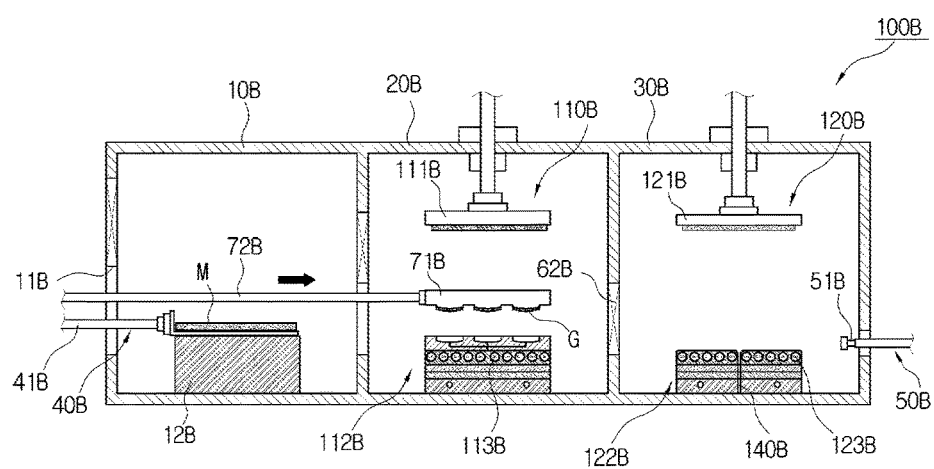

GLASS FORMING APPARATUS AND METHOD

CROSS-REFERENCE TO RELATED APPLICATION(S)

The present application claims priority under 35 U.S.C. § 365 to International Patent Application No. PCT/KR2015/009212 filed Sep. 2, 2015, entitled "APPARATUS FOR MOLDING GLASS AND METHOD FOR MOLDING", and, through International Patent Application No. PCT/KR2015/009212, to Korean Patent Application No. 10-2014-0148991 filed Oct. 30, 2014, and to Korean Patent Application No. 10-2015-0102880 filed Jul. 21, 2015, each of which are incorporated herein by reference into the present disclosure as if fully set forth herein.

TECHNICAL FIELD

Embodiments of the present invention relate to an apparatus for forming a glass having a curved surface and a method of forming a glass.

BACKGROUND ART

Generally, use of smart devices including touch panels, such as portable terminals, smartphones, or tablets, is increasing. Smart devices are produced in various types ranging from smartphones which have relatively small touch panels to tablets which have large touch panels.

Recently, interest in curved touch panels, so-called three dimensional touch panels, have been heightening. The curved touch panel can increase an actual touch area of the panel as well as the aesthetic thereof.

Meanwhile, in order to produce the curved touch panel, a glass used for a cover glass on the touch panel should be formed in a curved surface.

A method which forms a curved glass by grinding a glass surface using a grinder or the like has been widely used as the method of forming the curved glass. However, the grinding method requires hard work to meet surface roughness and transmittance requirements of the glass, has a high rate of scratching and breakage of the glass, and long forming time is necessary due to high resistance during grinding, and thus there is a problem in that the productivity thereof can be decreased.

DISCLOSURE

Technical Problem

Therefore, it is an aspect of the present invention to provide a glass forming apparatus capable of reducing process time and increasing productivity by forming a glass using gravity and absorption, and a forming method using the same.

It is another aspect of the present invention to provide a glass forming apparatus capable of making a more precise curved surface using a curved surface forming unit including a suction path having a stacked structure, and a forming method using the same.

It is still another aspect of the present invention to provide a glass forming apparatus capable of securing high quality and productivity through a precise control, and a forming method using the same.

It is yet another aspect of the present invention to provide a glass forming apparatus to which a two-stage stacked structure or index structure is applicable to minimize an installation area, and a forming method using the same.

Additional aspects of the invention will be set forth in part in the description which follows and, in part, will be obvious from the description, or may be learned by practice of the invention.

Technical Solution

In accordance with one aspect of the present invention, a glass forming apparatus includes a transfer unit which moves a material; a preheating unit which preheats the material supplied by the transfer unit; a curved surface forming unit which forms the material into a curved shape; and a cooling unit which cools the material in the curved shape transformed by the curved surface forming unit, wherein the curved surface forming unit includes a moving mold in which a plurality of curved surface-shaped cores configured to seat the preheated material are formed and the moving mold is provided to be movable, a first mold disposed to face the moving mold, a plurality of cavities formed between the moving mold and the first mold, and a pneumatic device which generates a vacuum pressure in the plurality of cavities to adhere the material to the curved surface-shaped cores.

The pneumatic device may include a vacuum pump, a surge tank connected with the vacuum pump, and a suction path provided to connect the surge tank and the plurality of cavities.

The suction path may include a first suction path formed in the moving mold, and a second suction path which connects the first suction path and the surge tank.

The moving mold may include a plurality of plates, and the suction path is formed by assembling the plurality of plates.

Each of the plates may include a first plate provided with the curved surface-shaped core, and a second plate provided to be coupled to the first plate.

The transfer unit may include a material supply unit provided to pick up and supply the material to the preheating unit, a moving mold transfer unit which moves the moving mold, and an unloading unit which unloads the curved material cooled by the cooling unit.

The moving mold transfer unit may include a first moving member which grips and moves the moving mold in a first direction, and a second moving member which moves the moving mold in a second direction perpendicular to the first direction.

The first direction may be a longitudinal direction of the glass forming apparatus, and the second direction may be a width direction of the glass forming apparatus.

The moving mold may form a closed loop which circulates in the first direction and the second direction.

The curved surface forming unit may include a second mold provided so that the moving mold is provided to be separably mounted, and the second mold may include a plurality of forming heaters.

The first suction path may be provided in the moving mold.

At least a part of the second suction path may be formed in the second mold.

The plurality of cavities may be provided in the moving mold.

The plurality of cavities may be formed in the first mold.

The curved surface forming unit may further include a weight provided on the first mold.

The glass forming apparatus may include an index structure provided on a rotating table.

In accordance with another aspect of the present invention, a method of forming a glass includes circulating a moving mold, loading a material into the moving mold, moving the moving mold to a preheating unit and preheating the material, moving the moving mold to a curved surface forming unit and forming the material by vacuum-suctioning the material, moving the moving mold to a cooling unit and cooling the material, unloading the cooled material, and moving the moving mold and reloading a material.

The curved surface forming unit may include a moving mold in which a plurality of curved surface-shaped cores configured to seat the preheated material are formed, a first mold provided to form a plurality of cavities between the moving mold and the first mold, a second mold provided so that the moving mold is separated, and a pneumatic device provided to generate a vacuum pressure in the plurality of cavities, wherein the pneumatic device adheres the preheated material to the curved surface-shaped core.

The pneumatic device may include a vacuum pump, a surge tank connected with the vacuum pump, a suction path provided to connect the surge tank and the plurality of cavities.

The suction path may include a first suction path formed in the moving mold, and a second suction path provided to connect the first suction path and the surge tank.

The moving mold may include a plurality of plates, and the suction path is formed by stacking the plurality of plates on each other.

In accordance with still another aspect of the present invention, a method of forming a glass includes loading a material having a plate shape into at least one of a plurality of moving molds which circulate in a closed loop, moving the moving mold and preheating the material, moving the moving mold above a second mold so that a plurality of cavities are formed between a first mold and the moving mold, heating the second mold while generating a vacuum pressure in the plurality of cavities and adhering the material to a curved surface-shaped core of the moving mold, moving the moving mold and cooling the material, unloading the cooled material, and moving the moving mold and reloading a material.

The glass forming method may further include a pneumatic device provided to generate a vacuum pressure in the plurality of cavities, wherein the pneumatic device includes a vacuum pump, a surge tank connected with the vacuum pump, and a suction path provided to connect the surge tank and the plurality of cavities.

The suction path may include a first suction path provided in the moving mold, and a second suction path which connects the first suction path and the surge tank.

The moving mold may include a plurality of plates, and the suction path is formed by assembling the plates.

Each of the plurality of plates may include a first plate in which the curved surface-shaped core is formed, and a second plate provided to be coupled to the first plate.

In accordance with yet another aspect of the present invention, a forming apparatus which forms a material into a glass having a curved shape includes: a first chamber provided to supply or recover a moving mold in which a plurality of curved surface-shaped cores configured to seat the material is provided; a second chamber provided to perform one of preheating and cooling processes on the material supplied through the first chamber; and a third chamber connected with the second chamber and provided to form the preheated material into a glass having a curved shape using a curved surface forming unit, wherein the moving mold is provided to circulate through the first chamber, the second chamber, and the third chamber.

The first chamber may include a supply unit provided to supply the material to the second chamber, and an unloading unit provided to unload the cooled glass in the second chamber.

The second chamber may maintain a temperature in the range of room temperature to an annealing point.

The third chamber may maintain a temperature in the range of the annealing point to softening point.

The curved surface forming unit may include a moving mold in which a plurality of curved surface-shaped cores configured to seat the preheated material are formed, a first mold provided to form a plurality of cavities between the moving mold and the first mold, a second mold provided to be separable below the moving mold so that the moving mold is movable, and a pneumatic device provided to generate a vacuum pressure in the plurality of cavities, wherein the preheated material is adhered to the curved surface-shaped core by the pneumatic device.

The pneumatic device may include a vacuum pump, a surge tank connected with the vacuum pump, and a suction path provided to connect the surge tank and the plurality of cavities.

The suction path may include a first suction path formed in the moving mold, and a second suction path which connects the first suction path and the surge tank.

The moving mold may include at least one plate, and the suction path is formed by the plate.

Advantageous Effects the glass forming apparatus and the forming method in accordance with embodiments of the present invention has effects of reduction of process time and an increase in productivity using a forming method using gravity and absorption.

Further, the glass forming apparatus and the forming method in accordance with the embodiments of the present invention has effects of securing high quality and productivity through precise control.

Furthermore, the glass forming apparatus and the forming method in accordance with the embodiments of the present invention has effects of minimizing an apparatus installation area because a two stage stacked structure or index structure can be applied to the apparatus.

DESCRIPTION OF DRAWINGS

These and/or other aspects of the present disclosure will become apparent and more readily appreciated from the following description of the embodiments, taken in conjunction with the accompanying drawings of which:

FIG. 1 is a perspective view schematically illustrating a portable terminal according to an embodiment of the present invention;

FIG. 2 is a cross-sectional view schematically illustrating a portable terminal glass according to an embodiment of the present invention;

FIG. 3 is a schematic view illustrating a forming method using a portable terminal glass forming apparatus according to an embodiment of the present invention;

FIG. 4 is a plan view schematically illustrating the portable terminal glass forming apparatus according to an embodiment of the present invention;

FIG. 5 is a view schematically illustrating a transfer unit of the portable terminal glass forming apparatus according to an embodiment of the present invention;

FIG. 6 is a view schematically illustrating a mold transfer unit of the portable terminal glass forming apparatus according to an embodiment of the present invention;

FIG. 7 is a view schematically illustrating a movement of a moving mold of the portable terminal glass forming apparatus according to an embodiment of the present invention;

FIG. 8 is a side view schematically illustrating a preheating unit, a curved surface forming unit, and a cooling unit of the portable terminal glass forming apparatus according to an embodiment of the present invention;

FIG. 9 is a perspective view schematically illustrating the preheating unit according to an embodiment of the present invention;

FIG. 10 is a view schematically illustrating the curved surface forming unit according to one embodiment of the present invention;

FIG. 11 is a perspective view illustrating a moving mold of the curved surface forming unit according to one embodiment of the present invention;

FIG. 12 is an exploded perspective view illustrating the moving mold of the curved surface forming unit according to one embodiment of the present invention;

FIG. 13 is a cross-sectional view taken along line A-A' shown in FIG. 11;

FIG. 14 is an enlarged view of a region B shown in FIG. 13, and is a view illustrating a suction path according to one embodiment of the present invention;

FIG. 15 is an exploded perspective view illustrating a second mold of the curved surface forming unit according to one embodiment of the present invention;

FIG. 16 is a perspective view illustrating a moving mold of a curved surface forming unit according to another embodiment of the present invention;

FIG. 17 is an exploded perspective view illustrating the moving mold of the curved surface forming unit according to another embodiment of the present invention;

FIG. 18 is a cross-sectional view taken along line C-C' shown in FIG. 16;

FIG. 19 is a perspective view illustrating a curved surface forming unit according to still another embodiment of the present invention;

FIG. 20 is a view schematically illustrating an operation of the curved surface forming unit according to still another embodiment of the present invention;

FIG. 21 is an enlarged view of a region D shown in FIG. 20;

FIG. 22 is a view illustrating a portable terminal glass forming apparatus in which the curved surface forming unit is applied to an index structure according to still another embodiment of the present invention;

FIG. 23 is a schematic view illustrating a forming method using the portable terminal glass forming apparatus according to still another embodiment of the present invention; and FIGS. 24 to 30 are views illustrating forming methods using the portable terminal glass forming apparatus according to still another embodiment of the present invention.

BEST MODE

Reference will now be made in detail to the embodiments of the present invention, examples of which are illustrated in the accompanying drawings, wherein like reference numerals refer to like elements throughout. Meanwhile, terms in the below description "front end" "back end" "upper portion" "lower portion" "upper end", "lower end" and the like are defined based on the drawings, and shapes and positions are not limited by the terms above.

Hereinafter, the embodiments of the present invention will be described with reference to the accompanying drawings in detail. A glass forming apparatus according to the present invention may be applied to all kinds of injection products each including a glass having a curved surface. The glass forming apparatus of the present invention may include a glass forming apparatus for forming glass of portable terminals.

For example, the portable terminals may include smartphones, tablet PCs or the like. In the embodiments of the present invention, a portable terminal 1 will be described with one example of a smartphone.

As illustrated in FIGS. 1 to 2, a portable terminal 1 includes a case 11 and a window glass (hereinafter, referred to as glass) disposed on a front surface of the case 11.

The glass 10 may have a curved surface 10a for a user's convenience and aesthetic improvement. The curved surface 10a of the glass 10 may be adhered to a user during a call to improve the user's sense of stability.

FIG. 3 is a schematic view illustrating a forming method using a portable terminal glass forming apparatus for according to an embodiment of the present invention, and FIG. 4 is a plan view schematically illustrating the portable terminal glass forming apparatus according to an embodiment of the present invention.

As illustrated in FIGS. 3 to 4, a portable terminal glass forming apparatus 100 for forming the glass 10 having the curved surface 10a includes a transfer unit 200 provided to move a planar material 20, a preheating unit 110 provided to preheat the planar material 20, a curved surface forming unit 300 provided to form the planar material 20 into a curved shape, and a cooling unit 120 provided to cool the material transformed into the curved shape by the curved surface forming unit 300.

The portable terminal glass forming apparatus 100 is installed on a frame 101. The upper portion of the frame 101 may be divided into a front left, a front right, a rear left, and a rear right.

The preheating unit 110, the curved surface forming unit 300, and the cooling unit 120 of the portable terminal glass forming apparatus 100 may be sequentially disposed in a direction from a left L1 to a right r1 of the front of the frame 101.

In addition, the preheating unit 110, the curved surface forming unit 300, and the cooling unit 120 may be disposed in a direction from a right r2 to a left L2 of the rear of the frame 101 in the order of the preheating unit 110, the curved surface forming unit 300, and the cooling unit 120.

That is, when seen in a plan view, the portable terminal glass forming apparatus 100 according to the embodiment of the present invention may form forming lines in parallel, that is, a '=' shape. The forming lines may have a forming line in the order of the preheating unit 110, the curved surface forming unit 300, and the cooling unit 120 (from the left to the right), and a forming line in the order the cooling unit 120, the curved surface forming unit 300, and the preheating unit 110 (from the right to the left). A circulating closed loop process may be performed through the forming lines in parallel. Meanwhile, the direction from the left L1 to the right r1 of the front of the frame 101 and the opposite direction, that is, the direction from the right r2 to the left L2 of the rear thereof, are referred to as a first direction. That is, the first direction is a longitudinal direction of the frame.

Further, a direction from the front to the rear of the frame 101 is referred to as a second direction, and the opposite direction, that is, a direction from the rear to front of the frame 101 is also referred to as the second direction. The second direction is a width direction of the frame.

The planar material 20 is loaded from the front left L1 of the frame 101 to the preheating unit 110 using the transfer unit 200.

At this time, the planar material 20 is placed on a moving mold 400 of the preheating unit 110 which will be described below.

The moving mold 400 is provided to circulate through a plurality of preheating units 110, curved surface forming units 300, and cooling units 120 provided on the frame 101.

The moving mold 400 is provided to circulate from the front left to the front right, from the front right to the rear right, from the rear right to the rear left, and from the rear left to the front left of the frame 101.

A plurality of curved surface-shaped cores 411 may be formed on the moving mold 400 so that the planar material 20 is seated.

Meanwhile, the completely preheated moving mold 400 and the planar material 20 seated on the moving mold 400 are moved to the curved surface forming unit 300, and the planar material 20 is formed into the glass 10 having a curved shape.

The curved glass 10 which is completely formed is moved to and cooled in the cooling unit 120 in the front right r1 of the frame 101. After being cooled, the curved glass 10 is unloaded to the outside.

Further, the moving mold 400 from which the completely cooled curved glass 10 is unloaded is moved to the preheating unit 110 in the rear right r2 of the frame 101 by a second moving member 250 of the transfer unit 200 which will be described below, is supplied with a planar material 20 by the transfer unit 200, and forms a curved glass 10 from the planar material 20 using the curved surface forming unit 300 while being moved toward the rear left L2 of the frame 101, and the curved glass 10 is cooled by and unloaded from the cooling unit 120.

Here, a process performed by moving from the left L1 to the right r1 of the front of the frame 101 refers to a first forming line F, and a process performed by moving from the right r2 to the left L2 of the rear of the frame 101 refers to a second forming line R.

The preheating, curved surface forming, and cooling processes which are performed in the first forming line F refers to a first process 100a, and the preheating, curved surface forming, and cooling processes which are performed in the second forming line R refers to a second process 100b.

Meanwhile, the first process 100a and the second process 100b may be controlled to be performed simultaneously or separately.

In the embodiment of the present invention, it is illustrated as an example that the preheating, forming, and cooling processes are performed in a direction from the left to the right of the front and from the right to the left of the rear of the frame 101, but the concept of the present invention is not limited thereto. For example, the preheating, forming, and cooling processes may be performed in a direction from the right to the left of the front and from the left to the right of the rear of the frame.

Meanwhile, the transfer unit 200 provided to move a planar material 20 includes a material supply unit 210 for supplying the planar material 20 to the preheating unit 110, a moving mold transfer unit 220 provided to sequentially move the moving mold 400 on which the material 20 is preheated by the preheating unit 110 is provided to the curved surface forming unit 300 and the cooling unit 120, and an unloading unit 230 for unloading a curved glass 10 which is completely cooled and formed.

The moving mold transfer unit 220 includes a first moving member 240 which grips the moving mold 400 and moves the moving mold 400 in a direction of movement of the material 20, that is, the first direction, and the second moving member 250 which moves the moving mold 400 in a second direction perpendicular to the first direction.

At this time, the second direction includes a direction from the front to the rear or the rear to the front of the frame 101.

The transfer unit 200 may be provided in each of both end portions of the frame 101.

FIG. 5 is a view schematically illustrating a transfer unit of the portable terminal glass forming apparatus according to an embodiment of the present invention, and FIG. 6 is a view schematically illustrating a mold transfer unit of the portable terminal glass forming apparatus according to an embodiment of the present invention.

As illustrated in FIGS. 5 and 6, the material supply unit 210 of the transfer unit 200 is provided in each end portion of the frame 101.

The material supply unit 210 may be disposed in a left end portion of the frame 101 to supply the material 20 to the preheating unit 110 of the first process 100a, and may be disposed in the right end portion of the frame 101 to supply the material 20 to the preheating unit 110 of the second process 100b.

The material supply unit 210 may include a material loader 211 on which the planar material 20 picked up from a plurality of planar materials (not shown) is loaded on and then supplied to an upper surface of the moving mold 400 of the preheating unit 110, and a driver 212 which drives the material loader 211.

The driver 212 is provided to slide and move the material loader 211.

Accordingly, the planar material 20 loaded on the material loader 211 is moved to the moving mold 400 on the preheating unit 110 by the movement of the driver 212, and is formed through the first forming line F.

The unloading unit 230 disposed in the rear of the transfer unit 200 is provided to unload the curved glass 10 which is completely cooled by the cooling unit 120.

The unloading unit 230 may include a planar unloader 231 provided to be movable in forward and backward directions to receive the completely cooled glass 10 from the transfer unit 200 of the cooling unit 120.

Meanwhile, the moving mold transfer unit 220 for moving the moving mold 400 includes the first moving member 240 provided to move the moving mold 400 into the first and second forming lines F and R, and the second moving member 250 provided to move the moving mold 400 from the first forming line F to the second forming line R.

Here, the first and second forming lines F and R may be formed in a chamber filled with an inert gas. Since the inside of the chamber is filled with the inert gas, it is possible to prevent oxidation of a plurality of molds.

The first moving member 240 is provided so that the moving mold 400 is moved sequentially in the order of the preheating process, the forming process, and the cooling process inside of the chamber. The first moving member 240 may include a moving bar 241, a pickup portion 242 installed on the moving bar 241, and a moving bar driver 243 for driving the moving bar 241.

The moving bar 241 is installed parallel to the movement direction of the material 20 in the first forming line F, the pickup portion 242 is installed on the moving bar 241 at equidistant intervals and provided to move the moving mold 400 together with the moving bar 241.

Here, a rotating unit (not shown) is installed between the pickup portion 242 and the moving bar 241 to rotate the pickup portion 242 90°, and the pickup portion 242 may be connected with or separated from the moving mold 400 by rotation thereof.

Accordingly, when the pickup portion 242 and the moving mold 400 are connected, the moving mold 400 moves, and when the movement is completed, the pickup portion 242 rotates and is separated from the moving mold 400.

The second moving member 250 may include a guide rail 251 formed in a width direction of the portable terminal glass forming apparatus 100 to connect the first forming line F and the second forming line R, a moving member 252 provided to be movable along the guide rail 251, and a pickup unit 253 which picks up the moving mold 400 in an end portion of the moving member 252.

The second moving member 250 may be provided in each of the left and right end portions of the first forming line F and the second forming line R.

The second moving member 250 moves the moving mold 400 from which the completely formed and cooled curved glass 10 is unloaded to another forming line so that the operation may be continued without interrupting a process.

For example, when a glass 10 completely cooled by the cooling unit 120 of the first forming line F is unloaded, the moving mold 400 in an initial state is moved to the preheating unit 110 of the second forming line R, and thus a forming process of the second forming line R is performed.

In addition, when a glass 10 is completely cooled by the cooling unit 120 of the second forming line R is unloaded, the moving mold 400 in an initial state is also moved to the preheating unit 110 of the first forming line F, and thus the forming process is performed.

FIG. 7 is a view schematically illustrating a state of movement of a moving mold according to an embodiment of the present invention.

As illustrated in FIG. 7, the moving mold 400 provided on a second preheating mold 112 of the first preheating unit 110 of the first forming line F is moved through gradationally formed curved surface forming units AF2, AF3, and AF4 to gradationally formed cooling units AF5, AF6, and AF7 by the first moving member 240, and is cooled.

At this time, a completely formed glass 10 is unloaded from the cooling unit AF7, which is the last step, and the moving mold 400 on the cooling unit 120 is moved to the first preheating unit AR7 of the second forming line R by the second moving member 250.

The moving mold 400 preheated on the first preheating unit AR7 of the second forming line R is formed and cooled through the gradationally formed curved surface forming units AR6, AR5, and AR4 and the gradationally formed cooling units AR3, AR2, and AR1 by the first moving member 240.

At this time, the completely formed glass 10 is unloaded from the cooling unit AR1 which is the last step, and the moving mold 400 in the cooling unit 120 is moved to the first preheating unit AF1 of the first forming line F by the second moving member 250.

Meanwhile, an upper portion of the frame 101 is divided into a front left, a front right, a rear left, and a rear right, and the portable terminal glass forming apparatus 100 may include a first process portion 100a in which the moving mold 400 having the planar material 20 is positioned at the front left of the frame 101 and is preheated by the preheating unit 110 while being moved to the front right, the planar material 20 is heated and formed into the curved shape by the curved surface forming unit 300, and the product formed in a curved shape is cooled by the cooling unit 120 and is unloaded.

In addition, the portable terminal glass forming apparatus 100 may include a second process portion 100b in which the moving mold 400 from which the formed product is unloaded is moved to the rear right of the frame 101 in the front right of the frame 101, and is preheated by the preheating unit 110 while the planar material 20 is loaded therein and moved to the rear left of the frame 101, and the material is preheated and formed into a curved shape by the curved surface forming unit 300, is cooled by the cooling unit 120, and is unloaded.

The second process portion 100b includes the same structure as the first process portion 100a, and the same reference numbers used for the same components, and thus the description thereof will not be repeated.

The moving mold 400 forms a closed loop which circulates through the first process portion 100a and the second process portion 100b, and may be provided to circulate through the first process portion 100a and the second process portion 100b. In the embodiment of the present invention, it is illustrated as an example that the first process portion and the second process portion are disposed in parallel, but the concept of the present invention is not limited thereto. For example, the closed loop may have a circular or oval shape so that the moving mold may circulate.

FIG. 8 is a side view schematically illustrating a preheating unit, a curved surface forming unit, and a cooling unit of the portable terminal glass forming apparatus according to an embodiment of the present invention, FIG. 9 is a perspective view schematically illustrating the preheating unit according to an embodiment of the present invention, and FIG. 10 is a view schematically illustrating a curved surface forming unit according to one embodiment of the present invention.

As illustrated in FIGS. 8 to 10, the portable terminal glass forming apparatus 100 according to the embodiment of the present invention may include the preheating unit 110, the curved surface forming unit 300, and the cooling unit 120. The preheating unit 110 includes a first preheating mold 111 under which a cavity 410 between the first preheating mold 111 and the moving mold 400, and the second preheating mold 112 provided to be separable under the moving mold 400 so that the moving mold 400 is movable.

The preheating unit 110 is provided to heat the moving mold 400 at room temperature to raise a temperature thereof to a predetermined temperature. In the embodiment of the present invention, it is illustrated as an example that the preheating unit 110F is provided singularly, but the concept of the present invention is not limited thereto. For example, one or more preheating units 110, that is, a plurality of preheating units 110, may be formed to gradationally preheat a mold.

The first preheating mold 111 is provided to be vertically movable above the moving mold 400, the second preheating mold 113 is provided under the moving mold 400, and thus the moving mold 400 is provided to be separable.

Accordingly, the moving mold 400 may be separated from the second preheating mold 113 and be moved.

A plurality of curved surface-shaped cores 411 having curved surfaces may be formed in the moving mold 400. At least one curved surface-shaped core 411 may be formed.

The cavity 410 may be formed between the moving mold 400 and the first preheating mold 111. The cavity 410 may be formed between the moving mold 400 and the first preheating mold 111 facing the moving mold 400.

The cavity 410 may be formed in plural number between the curved surface-shaped core 411 of the moving mold 400 and the first preheating mold 111. The cavities 410 may be formed to correspond to the number of the curved surface-shaped cores 411 of the moving mold 400. At least one cavity 410 may be formed.

In the embodiment of the present invention, an example of forming nine cavities of the moving mold is illustrated, but the concept of the present invention is not limited thereto.

Meanwhile, a preheater 113 for preheating may be provided in plural number in the second preheating mold 112.

Accordingly, when the moving mold 400 in which a planar material 20 is loaded on each of upper surfaces of the plurality of cavities 410 is moved to the second preheating mold 112 of the preheating unit 110 by the transfer unit 200, the first preheating mold 111 moves downward, and the preheater 113 operates and preheats the planar material 20 loaded in the moving mold 400.

As illustrated in FIG. 10, the curved surface forming unit 300 may include a first mold 310 under which the plurality of cavities 410 are formed between the first mold 310 and the moving mold 400, and a second mold 320 from which a lower portion of the moving mold 400 is separated so that the moving mold 400 is movable.

The first mold 310 is provided above the moving mold 400 to be vertically movable, the second mold 320 is provided under the moving mold 400, and thus the moving mold 400 is provided to be separable.

The first mold 310 is disposed to face the top of the moving mold 400.

The first mold 310 and the second mold 320 are provided to raise a temperature of the preheated moving mold 400 to a forming temperature. In the embodiment of the present invention, it is illustrated as an example that the temperatures of the first mold 310 and the second mold 320 are gradually raised in five steps, but the concept of the present invention is not limited thereto. For example, one or more steps, i.e., a plurality of steps, may be provided to gradationally heat the mold.

Meanwhile, the curved surface forming unit 300 may further include a pneumatic device 340 provided to generate a vacuum pressure in the cavity 410 of the moving mold 400 to adhere the material 20 to the curved surface-shaped core 411.

The pneumatic device 340 may be disposed under the moving mold 400. The pneumatic device 340 may include a vacuum pump 341, a surge tank 342 connected to the vacuum pump 341, and a suction path 343 provided to connect the surge tank 342 and the cavity 410.

FIG. 11 is a perspective view illustrating a moving mold of the curved surface forming unit according to one embodiment of the present invention, FIG. 12 is an exploded perspective view illustrating the moving mold of the curved surface forming unit according to one embodiment of the present invention, FIG. 13 is a cross-sectional view taken along line A-A' shown in FIG. 11, FIG. 14 is an enlarged view of a region B shown in FIG. 13, and is a view illustrating a suction path according to one embodiment of the present invention, and FIG. 15 is an exploded perspective view illustrating a second mold of the curved surface forming unit according to one embodiment of the present invention.

As illustrated in FIGS. 11 to 15, the moving mold 400 according to one embodiment of the present invention may include a plurality of plates 400a, 400b, and 400c.

The moving mold 400 may include the first plate 400a, the second plate 400b, and the guide plate 400c. The first plate 400a, the second plate 400b, and the guide plate 400c are formed in planar shapes and stacked.

A curved surface-shaped core 411 is formed on the first plate 400a. The curved surface-shaped core 411 is formed to protrude from an upper surface of the first plate 400a. The curved surface-shaped core 411 is formed in plural number on the first plate 400a.

The second plate 400b is assembled at an upper surface of the first plate 400a. The second plate 400b is assembled with the first plate 400a and forms a part of a cavity 410. Cavity forming holes 410b corresponding to the curved surface-shaped cores 411 of the first plate 400a may be formed in the second plate 400b. The cavity forming holes 410b are formed to correspond to sizes, shapes, and the number of the curved surface-shaped cores 411.

The guide plate 400c is assembled at an upper surface of the second plate 400b. The guide plate 400c is assembled with the first plate 400a and the second plate 400b, and forms a remaining part of the cavity 410. Guide holes 410a corresponding to the curved surface-shaped cores 411 of the first plate 400a are formed in the guide plate 400c. The guide holes 410a may be formed to correspond to sizes, shapes, and the number of the curved surface-shaped cores 411.

Meanwhile, a part of a suction path 343 may be formed between the first plate 400a and the second plate 400b to connect the cavity 410 and the pneumatic device 340.

The suction path 343 may include a first suction path 343a formed in the moving mold 400, and a second suction path 343b which connects the first suction path 343a and the surge tank 342 outside of the moving mold 400.

The first suction path 343a is formed between the first plate 400a and the second plate 400b. The first suction path 343a is formed by assembling the first plate 400a and the second plate 400b. The first suction path 343a may be formed at a space between the first plate 400a and the second plate 400b when the first plate 400a and the second plate 400b are stacked.

The first suction path 343a includes a first suction path forming portion 344a formed by an outer perimeter step difference 400a' of the curved surface-shaped core 411 of the first plate 400a, and a second suction path forming portion 344b formed by a perimeter step difference 400b' of the cavity forming hole 410b of the second plate 400b.

That is, the first suction path 343a may be formed by connecting the first suction path forming portion 344a of the first plate 400a and the second suction path forming portion 344b of the second plate 400b.

Meanwhile, the first suction path 343a is connected to the second suction path 343b under the moving mold 400. The second suction path 343b is connected to the surge tank 342. The first suction path 343a is connected to the second suction path 343b and thus is connected to the surge tank 342.

In the first suction path 343a, a first width t1 formed by the first suction path forming portion 344a of the first plate 400a, and a second width t2 and a third width t3 formed by the second suction path forming portion 344b of the second plate 400b are formed to be different from each other.

At this time, the first width t1 may be formed to be greater than the second and third widths. The widths t1, t2, and t3 of the first suction path 343a may be changed variously by design. A suction force of the pneumatic device 340 may be controlled by variously changing the widths t1, t2, and t3 of the first suction path 343a.

Meanwhile, a second mold 320 to which the moving mold 400 of the curved surface forming unit 300 is moved and coupled may include a heating block 320a, a heat sink 320b, a forming plate 320c, a cooling block 320d, and a suction path 351d. The second mold 320 is formed to correspond to a size and a shape of the moving mold 400. The second mold 320 may have a hexahedral shape.

The heating block 320a is provided to heat the moving mold 400. The heating block 320a includes a heating block suction hole 350a, a heater accommodation portion 323, and a heater 330.

The heating block suction hole 350a is provided to be connected with the pneumatic device 340. The heating block suction hole 350a may be formed at a position corresponding to that of the first suction path 343a of the moving mold 400.

The heater accommodation portion 323 of the heating block 320a is provided to accommodate the heater 330. The heater accommodation portion 323 is formed so that the heater 330 passes through a side surface of the heating block 320a. A plurality of heater accommodation portions 323 may be formed.

The heater 330 may include a heater 330a and a heater cable 330b connected to the heater 330a. The heater 330 is provided to heat the heating block 320a.

The heat sink 320b is provided under the heating block 320a. The heat sink 320b is provided to be stacked between the heating block 320a and the cooling block 320d, and to control a temperature of the second mold 320. A heat sink suction hole 350b corresponding to the heating block suction hole 350a may be formed at the center of the heat sink 320b. The heat sink suction hole 350b may form a part of the second suction path 343b connected with the pneumatic device 340.

One or more heat sinks 320b, that is, a plurality of heat sinks 320b, may be formed. The heat sink 320b is formed to have a plurality of hollow portions, and includes one or more protrusions for contacting the forming plate 320c. The contact area between the heating block 320a and the forming plate 320c may be changed by the hollow portion and the protrusion of the heat sink.

The forming plate 320c is stacked between the heat sink 320b and the cooling block 320d. The forming plate 320c is provided to transmit cooling air of the cooling block 320d to the heat sink 320b. In addition, the forming plate 320c may be coupled to the cooling block 320d by a plurality of coupling members 337a and coupling holes 337b. A forming plate suction hole 350c is formed at the center of the forming plate 320c. The forming plate suction hole 350c is vertically disposed under the heat sink suction hole 350b. The forming plate suction hole 350c may form the part of the second suction path 343b connected with the pneumatic device 340.

The cooling block 320d is a cooling unit for controlling the temperature of the second mold 320. The cooling block 320d is stacked on the forming plate 320c. The cooling block 320d may include a cooling block suction hole 350d and the suction path 351d. The cooling block suction hole 350d is vertically disposed under the forming plate suction hole 350c, and forms the part of the second suction path 343b connected with the pneumatic device 340.

The suction path 351d is provided to connect the heating block suction hole 350a, the heat sink suction hole 350b, the forming plate suction hole 350c, and the cooling block suction hole 350d. The suction path 351d is provided to be connected with the pneumatic device 340 to generate a vacuum absorption force.

Meanwhile, even though not illustrated, the cooling block may further include a path for cooling water to pass through provided to lower the temperature.

The suction path 351d of the second mold 320 forms a part of the second suction path 343b, and connects the first suction path 343a and the surge tank 342.

Accordingly, the pneumatic device 340 generates a vacuum absorption force at the second suction path 343b and the first suction path 343a, and the first suction path 343a generates a vacuum absorption force at the cavity 410 of the moving mold 400 to adhere the material 20 to a curved surface-shaped core 411.

FIG. 16 is a perspective view illustrating a moving mold of a curved surface forming unit according to another embodiment of the present invention, FIG. 17 is an exploded perspective view illustrating the moving mold of the curved surface forming unit according to another embodiment of the present invention, and FIG. 18 is a cross-sectional view taken along line C-C' shown in FIG. 16. Hereinafter, drawing numbers which are not shown may be referred to in FIGS. 1 to 15. In addition, the descriptions described in FIGS. 1 to 15 will not be repeated.

As illustrated in FIG. 16 to FIG. 17, a moving mold 400A of a curved surface forming unit 300 may include a plurality of plates 400Aa and 400Ab.

The moving mold 400A may include a first plate 400Aa and a second plate 400Ab. The first plate 400Aa and the second plate 400Ab are provided to be formed in a planar shape and to be stacked on each other.

A curved surface-shaped core 411A is formed on the first plate 400Aa. A plurality of curved surface-shaped cores 411A may be formed to protrude from an upper surface of the first plate 400Aa. In the embodiment, it is illustrated that the first plate 400Aa has nine curved surface-shaped cores 411A arranged in parallel, but the concept of the present invention is not limited thereto. For example, the number and arrangement of the curved surface-shaped cores may be changed.

A second plate 400Ab is assembled with an upper surface of the first plate 400Aa. The second plate 400Ab may be assembled with the first plate 400Aa to form cavities 410A. Cavity forming holes 410Ab corresponding to the curved surface-shaped cores 411 of the first plate 400Aa may be formed in the second plate 400Ab. The cavity forming holes 410Ab may be formed to correspond to sizes, shapes, and the number of the curved surface-shaped cores 411.

Meanwhile, a part of a suction path 343A may be formed between the first plate 400Aa and the second plate 400Ab to connect a cavity 140A to a pneumatic device 340.

The suction path 343A may include a first suction path 343Aa formed in the moving mold 400A, and a second suction path 343Ab connected with the first suction path 343Aa outside of the moving mold 400A.

The first suction path 343Aa is formed between the first plate 400Aa and the second plate 400Ab. The first suction path 343Aa is formed by assembling the first plate 400Aa and the second plate 400Ab. The first suction path 343Aa may be formed at a space between the first plate 400Aa and the second plate 400Ab when the first plate 400Aa and the second plate 400Ab are stacked on each other.

The first suction path 343Aa may be formed by an outer perimeter step difference 400Aa' of the curved surface-shaped core 411A of the first plate 400Aa.

Meanwhile, the first suction path 343Aa is connected with the second suction path 343Ab under the moving mold 400A. The second suction path 343Ab is connected with a surge tank 342.

Accordingly, the pneumatic device 340 generates a vacuum absorption force in the first suction path 343Aa, and the first suction path 343Aa generates a vacuum absorption force in the cavity 410A of the moving mold 400A to adhere a material 20 to the curved surface-shaped core 411A.

FIG. 20 is a view schematically illustrating an operation of the curved surface forming unit according to still another embodiment of the present invention, and FIG. 21 is an enlarged view of a region D shown in FIG. 20. Hereinafter, drawing numbers which are not shown may be referred to in FIGS. 1 to 19. In addition, the descriptions described in FIGS. 1 to 19 will not be repeated. As illustrated in FIGS. 20 to 21, a curved surface forming unit 300C may include a first mold 310C, a second mold 320C, and a moving mold 400C.

The curved surface forming unit 300C may include the first mold 310C under which cavities 410C are formed between the first mold 310C and the moving mold 400C, and the second mold 320C provided separately under the moving mold 400C so that the moving mold 400C is movable.

The first mold 310C is provided above the moving mold 400C to be vertically movable, and the second mold 320C is provided under the moving mold 400C so that the moving mold 400C is separable.

The first mold 310C and the second mold 320C are provided to raise a temperature of the preheated moving mold 400C to a forming temperature. Since a specific structure of the first mold 310C and the second mold 320C is the same as that of the above embodiment, the detailed descriptions thereof will be omitted.

When the first mold 310C moves downward to the moving mold 400C, a vacuum pump 341 of a pneumatic device 340 operates and the inside of a cavity 410C is formed in a vacuum state.

Accordingly, a preheated material 20 may be adhered to a curved surface-shaped core 411C through a suction hole 411Ca in the cavity 410C, and be precisely formed.

One or more curved surface-shaped cores 411C, that is, a plurality of curved surface-shaped cores 411C, are formed in the moving mold 400C. A plurality of suction holes 411Ca may be formed in the one or more curved surface-shaped cores 411C. The suction hole 411Ca may further include slits formed in the curved surface-shaped core 411C in parallel. In the embodiment of the present invention, it is illustrated that the suction hole 411Ca is a slot formed in a long shape, but the concept of the present invention is not limited thereto. For example, the suction hole 411Ca may include a plurality of holes.

Meanwhile, a first suction path 343Ca is formed in the moving mold 400C to connect a plurality of suction holes 411Ca and the pneumatic device 340. The first suction path 343Ca is connected with a second suction path 343Cb formed outside the moving mold 400C and connected with the pneumatic device 340.

Here, the first mold 310C may further include a weight W. The weight W added on the first mold 310C may press a material 20 in the cavity 410C due to gravity, and form a natural curved surface 10a.

FIG. 22 is a view illustrating a portable terminal glass forming apparatus in which the curved surface forming unit is applied to an index structure according to still another embodiment of the present invention.

In FIG. 22, a portable terminal glass forming apparatus 100A according to another embodiment of the present invention is disclosed.

A preheating unit 110A, a curved surface forming unit 300A, and a cooling unit 120A of the embodiment are disposed on an upper surface of a rotating plate 640A which rotates, and thus preheating, forming, and cooling processes of the index structure which rotates and moves may be performed.

At this time, the rotating plate 640A may be rotated by a motor (not shown) installed thereunder.

In the embodiment, a transfer unit 600A may include a material supply unit 610A provided to load a planar material 20, an unloader 620A for unloading a completely formed and cooled curved glass 10, and a driver 630A for driving the material supply unit 610A and the unloader 620A.

In addition, in the embodiment, it is illustrated as an example that the material supply unit 610A and the unloader 620A are disposed in one line, but the concept of the present invention is not limited thereto. For example, the material supply unit and the unloader may be separately formed.

In addition, even though not illustrated, the portable terminal glass forming apparatus according to the embodiment of the present invention may also be installed in two stages by stacking on the frame 101. The portable terminal glass forming apparatus according to another embodiment of the present invention has an effect for reducing an installation space.

FIG. 23 is a schematic view illustrating a forming method using the portable terminal glass forming apparatus according to still another embodiment of the present invention.

As illustrated in FIG. 23, a portable terminal glass forming apparatus 100B includes a first chamber 10B, a second chamber 20B, and a third chamber 30B.

The first chamber 10B is provided to supply or recover a raw material M, the second chamber 20B is provided to perform one of a preheat process and a cooling process on the raw material M supplied through the first chamber 10B using a multi-unit 110B, and the third chamber 30B is provided to form a curved portable terminal glass G from the planar raw material M completely preheated in the second chamber 20B using a curved surface forming unit 120B.

The first chamber 10B may be provided so that the planar raw material M is on standby or is recovered. A supply unit 40B is provided in the first chamber 10B to supply the raw material M to the first chamber 10B.

In addition, an unloading unit 70B for unloading the completely cooled curved portable terminal glass G from the second chamber 20B is provided in the first chamber 10B.

The multi-unit 110B is provided in the second chamber 20B to preheat or cool the raw material M.

Further, the curved surface forming unit 120B is provided in the third chamber 30B so that the preheated raw material M is formed into a curved shape.

Accordingly, the planar raw material M on standby in the first chamber 10B is supplied to the second chamber 20B by the supply unit 40B, and preheated in the second chamber 20B. When preheating is complete, the planar raw material M is moved to the third chamber 30B, and formed into the curved portable terminal glass G by the curved surface forming unit 120B.

At this time, in the curved surface forming unit 120B of the third chamber 30B, the raw material M softened by heat may be formed by the weight thereof or a vacuum pneumatic device 140B to be described below.

When formation is complete in the third chamber 30B, the curved portable terminal glass G is moved to the second chamber 20B and is cooled, and when cooling is complete, the curved portable terminal glass G is moved to the first chamber 10B and is unloaded by the unloading unit 70B.

The first to third chambers 10B, 20B, and 30B may be blocked from outside atmosphere so that heat therein does not escape to the outside. The first to third chambers 10B, 20B, and 30B may be filled with an inert gas to prevent the curved surface forming unit 120B from being oxidized.

As describes above, since a mold is commonly used for the preheating and cooling processes, the number of molds may be significantly decreased, and the process time may be reduced.

FIGS. 24 to 30 are views illustrating forming methods using the portable terminal glass forming apparatus to still another embodiment of the present invention.

As illustrated in FIGS. 24 to 30, a forming method using a portable terminal glass forming apparatus will be described below.

The portable terminal glass forming apparatus 100B includes a first chamber 10B, a second chamber 20B, and a third chamber 30B.

The first chamber 10B, the second chamber 20B, and the third chamber 30B may be installed to be in communication with each other. Here, a first open/close unit 61B may be installed between the first chamber 10B and the second chamber 20B, and a second open/close unit 62B may be installed between the second chamber 20B and the third chamber 30B.

The first open/close unit 61B and the second open/close unit 62B are provided to be vertically slidable, and are provided to open or close between the first chamber 10B and the second chamber 20B and between the second chamber 20B and the third chamber 30B.

Accordingly, when the first open/close unit 61B opens between the first chamber 10B and the second chamber 20B by moving upward, a planar raw material M is supplied to a multi-unit 110B in the second chamber 20B through a supply unit 40B.

The supply unit 40B may include a supplying bar 41B provided to be laterally slidable. In the embodiment of the present invention, the supply unit 40B provided to supply a raw material by sliding movement is illustrated as an example, but the concept of the present invention is not limited thereto. For example, the supplying unit may include a vacuum unit which adheres and moves a raw material using a vacuum.

The raw material M supplied by the supply unit 40B is seated on a moving mold 130B. The moving mold 130B includes a cavity 131B having a curved surface-shaped core 132B on an upper surface thereof.

The moving mold 130B is mounted on the multi-unit 110B in the second chamber 20B and is on standby, and when the raw material M is loaded on an upper surface thereof, the first open/close unit 61B is operated and the second chamber 20B is sealed and preheats.

The moving mold 130B may have one or more cavities 131B. In addition, the curved surface-shaped core 132B may be formed on each of the cavities 131B to form a curved surface on the raw material M.

The multi-unit 110B includes a first multi-mold 111B and a second multi-mold 112B provided to correspond to the first multi-mold 111B.

The cavity 131B is provided to be formed between the first multi-mold 111B and the moving mold 130B. The second multi-mold 112B is provided to be separable under the moving mold 130B so that the moving mold 130B is separable and movable.

The second multi-mold 112B may include a plurality of multi-heaters 113B to preheat the moving mold 130B.

The multi-heater 113B is provided to heat the raw material M with a low temperature for preheating. It is preferable that the multi-heater 113B be provided to maintain 400° C., and the second chamber 20B be provided to maintain a temperature in the range of room temperature and an annealing point.

Accordingly, when a planar raw material M is loaded on an upper surface of the moving mold 130B mounted on the second multi-mold 112B, the first multi-mold 111B moves downward, and the multi-heater 113B operates and preheats. (see FIG. 26)

When the raw material M is completely preheated, the second open/close unit 62B between the second chamber 20B and the third chamber 30B opens.

The moving mold 130B in the second chamber 20B is moved to the third chamber 30B by a transfer unit 50B.

A curved surface forming unit 120B is provided in the third chamber 30B for a formation of the completely preheated raw material.

The curved surface forming unit 120B includes a first forming mold 121B, and a second forming mold 122B corresponding to the first forming mold 121B. The second forming mold 122B may include a plurality of forming heaters 123B configured to preheat the moving mold 130B.

The first forming mold 121B is provided to form the cavity 131B between the first forming mold 121B and the moving mold 130B.

The second forming mold 122B is provided under the moving mold 130B so that the moving mold 130B is separable. In addition, a vacuum pneumatic device 140B for generating a vacuum pressure in the cavity 131B may be provided in the second forming mold 122B.

The moving mold 130B is loaded on the second forming mold 122B in the third chamber 30B by the transfer unit 50B.

When the second open/close unit 62B is operated and the third chamber 30B is sealed, the first forming mold 121B moves downward, and a forming heater 123B of the second forming mold 122B operates and performs a forming process.

At this time, the vacuum pneumatic device 140B is provided in the cavity 131B of the moving mold 130B, a vacuum pressure is generated in the cavity 131B, and a raw material M may be formed into a curved shape. (see FIG. 28)

Meanwhile, the forming heater 123B is provided to heat to a high temperature for forming. It is preferable that the forming heater 123B be provided to heat at a temperature of 900° C. or more.

In addition, it is preferable that the third chamber 30B maintain a temperature in the range of the annealing point and a softening point.

When a curved glass G is completely formed by the curved surface forming unit 120B in the third chamber 30B, the second open/close unit 62B opens.

The transfer unit 50B moves the moving mold 130B in which the formation is complete to the second chamber 20B.

When the moving mold 130B is loaded on the second multi-mold 112B in the second chamber 20B, the second open/close unit 62B is operated, and the second chamber 20B is sealed.

The first multi-mold 111B in the second chamber 20B moves downward, and cools the moving mold 130B and the glass G. (see FIG. 29)

When the glass G is completely cooled in the second chamber 20B, the first open/close unit 61B is operated and the second chamber 20B opens, and an unloading unit 70B is operated and the glass G in the moving mold 130B is unloaded.

The unloading unit 70B includes an unloading bar 72B provided to be slidable, and an unloader 71B provided to adhere a glass G in an end portion of the unloading bar 72B. At this time, the unloader 71B may be provided to vacuum-suction the glass G.

Meanwhile, when the completely cooled glass G is unloaded by the unloading unit 70B, the supply unit 40B immediately operates and supplies a planar raw material M to the second chamber 20B.

At this time, it is preferable that the unloaded glass G be secondarily cooled in the first chamber 10B.

As is apparent from the above description, the glass forming apparatus and the forming method in accordance with embodiments of the present invention has effects of reduction of process time and an increase in productivity using a forming method using gravity and absorption.

Further, the glass forming apparatus and the forming method in accordance with the embodiments of the present invention has effects of securing high quality and productivity through precise control.

Furthermore, the glass forming apparatus and the forming method in accordance with the embodiments of the present invention has effects of minimizing an apparatus installation area because a two stage stacked structure or index structure can be applied to the apparatus.

While the present invention has been described above in detail with reference to representative embodiments, the present invention is not limited to the specific embodiments described above, and it may be understood by those skilled in the art that the embodiment may be variously changed or modified without departing from the scope of the present invention.

The invention claimed is:

1. A glass forming apparatus comprising:
   a frame;
   a moving mold including a plurality of curved surface-shaped cores, and configured to seat a material, the moving mold being moveable in a first direction;
   a material supply unit disposed in the frame and configured to supply the material to the moving mold;
   an unloading unit disposed opposite to the material supply unit in the first direction and configured to unload the material from the moving mold;
   a preheating unit disposed between the material supply unit and the unloading unit, and configured to preheat the material seated on the moving mold;
   a curved surface forming unit configured to form the material in a curved shape, wherein the curved surface forming unit includes:
      a first mold disposed to face the moving mold forming a plurality of cavities formed between the moving mold and the first mold, and
      a pneumatic device including a vacuum pump and configured to generate a vacuum pressure in the plurality of cavities to adhere the material to the plurality of curved surface-shaped cores; and
   a cooling unit disposed between the curved surface forming unit and the unloading unit in the first direction and configured to cool the material in the curved shape transformed by the curved surface forming unit; and
   a moving mold transfer unit configured to move the moving mold through the preheating unit, the curved surface forming unit, and the cooling unit in the first direction.

2. The glass forming apparatus of claim 1, wherein the pneumatic device further includes:
   a surge tank connected with the vacuum pump; and
   a suction path provided to connect the surge tank and the plurality of cavities.

3. The glass forming apparatus of claim 2, wherein the suction path includes:
   a first suction path formed in the moving mold; and
   a second suction path which connects the first suction path and the surge tank.

4. The glass forming apparatus of claim 2, wherein the moving mold includes a plurality of plates and the suction path is formed by assembling the plurality of plates.

5. The glass forming apparatus of claim 4, wherein each of the plates includes:
   a first plate provided with the curved surface-shaped core; and
   a second plate provided to be coupled to the first plate.

6. The glass forming apparatus of claim 5, wherein a first suction path is formed between the first plate and the second plate.

7. The glass forming apparatus of claim 1, wherein the moving mold transfer unit includes:
   a first moving member including a bar extending in the first direction and configured to grip and move the moving mold in the first direction; and
   a second moving member disposed between the material supply unit and the unloading unit, and configured to move the moving mold in a second direction perpendicular to the first direction.

8. The glass forming apparatus of claim 7, wherein:
   the first direction is a longitudinal direction of the glass forming apparatus, and
   the second direction is a width direction of the glass forming apparatus.

9. The glass forming apparatus of claim 7, wherein the moving mold forms a closed loop that circulates in the first direction and the second direction.

10. The glass forming apparatus of claim 2, wherein:
    the curved surface forming unit includes a second mold provided so that the moving mold is provided to be separably mounted, and
    the second mold includes a plurality of forming heaters.

11. The glass forming apparatus of claim 10, wherein at least a part of a second suction path is formed in the second mold.

12. The glass forming apparatus of claim 1, wherein the plurality of cavities are provided in the moving mold.

13. The glass forming apparatus of claim 1, wherein the plurality of cavities are formed in the first mold.

14. The glass forming apparatus of claim 1, wherein the curved surface forming unit further includes a weight provided on the first mold.

15. A glass forming apparatus comprising:
    a moving mold including a plurality of curved surface-shaped cores, and configured to seat a material;
    a first forming line and a second forming line formed in parallel in opposite directions; each of the first forming line and the second forming line include:

a preheating unit configured to preheat the material seated on the moving mold;

a curved surface forming unit configured to form the material in a curved shape, wherein the curved surface forming unit includes:

a first mold disposed to face the moving mold forming a plurality of cavities formed between the moving mold and the first mold, and a pneumatic device configured to generate a vacuum pressure in the plurality of cavities to adhere the material to the plurality of curved surface-shaped cores, and a cooling unit configured to cool the material in the curved shape transformed by the curved surface forming unit;

a first transfer unit located at the first forming line, the first transfer unit configured to:

move the moving mold through the preheating unit, the curved surface forming unit, and the cooling unit of the first forming line, move the moving mold from the cooling unit of the first forming line to the preheating unit of the second forming line, and supply the material to the moving mold for the second forming line; and a second transfer unit located at the second forming line, the second transfer unit configured to:

move the moving mold through the preheating unit, the curved surface forming unit, and the cooling unit of the second forming line, move the moving mold from the cooling unit of the second forming line to the preheating unit of the first forming line, and supply the material to the moving mold for the first forming line.

* * * * *